United States Patent [19]

Sander

[11] Patent Number: 4,783,998

[45] Date of Patent: Nov. 15, 1988

[54] METHOD OF MONITORING THE OPERATION OF A CYCLICALLY MOVING, POWER GENERATING OR POWER TRANSMITTING ELEMENT AND AN APPARATUS FOR MONITORING THE OPERATION OF SUCH AN ELEMENT

[75] Inventor: Curt A. R. Sander, Hareskovby, Denmark

[73] Assignee: DME - Danish Micro Engineering A/S, Herlev, Denmark

[21] Appl. No.: 841,533

[22] PCT Filed: Jul. 5, 1985

[86] PCT No.: PCT/DK85/00065

§ 371 Date: Mar. 6, 1986

§ 102(e) Date: Mar. 6, 1986

[87] PCT Pub. No.: WO86/00714

PCT Pub. Date: Jan. 30, 1986

[30] Foreign Application Priority Data

Jul. 6, 1984 [DK] Denmark .............. 3355/84

[51] Int. Cl.⁴ ............................ G01M 13/02
[52] U.S. Cl. .................... 73/660; 73/862.34; 364/508
[58] Field of Search ............. 73/660, 862.32, 862.33, 73/862.34, 116, 117.3, 593; 340/683; 364/508

[56] References Cited

U.S. PATENT DOCUMENTS

| | | | |
|---|---|---|---|
| 3,309,920 | 3/1967 | Cuthbert | 73/862.34 |
| 3,484,686 | 12/1969 | Wade | 324/70 |
| 4,123,935 | 11/1978 | Maringer | 73/116 |
| 4,181,024 | 1/1980 | Leak et al. | 73/660 |
| 4,184,114 | 1/1980 | Minakuchi | 324/161 |
| 4,228,396 | 10/1980 | Palombo et al. | 324/163 |
| 4,295,363 | 10/1981 | Buck et al. | 73/117.3 |
| 4,453,407 | 6/1984 | Sato et al. | 73/660 X |
| 4,609,992 | 9/1986 | Bray | 364/508 |
| 4,612,620 | 9/1986 | Davis et al. | 73/660 X |
| 4,621,524 | 11/1986 | von Thun | 73/866.4 X |

FOREIGN PATENT DOCUMENTS

| | | |
|---|---|---|
| 2516569 | 10/1976 | Fed. Rep. of Germany . |
| 2618755 | 11/1976 | Fed. Rep. of Germany . |
| 2922529 | 1/1980 | Fed. Rep. of Germany . |
| 85/0065 | 8/1985 | PCT Int'l Appl. . |
| 1363053 | 8/1974 | United Kingdom . |
| 1500699 | 2/1978 | United Kingdom . |
| 1536276 | 12/1978 | United Kingdom . |

OTHER PUBLICATIONS

"Diesel Engine Health: Laser Diagnostics" by Halliwell et al., published at the International Off-Highway Meeting & Exposition, Sep. 12-15, 1983.

Primary Examiner—Jerry W. Myracle
Attorney, Agent, or Firm—Merchant, Gould, Smith, Edell, Welter & Schmidt

[57] ABSTRACT

Figure 1:
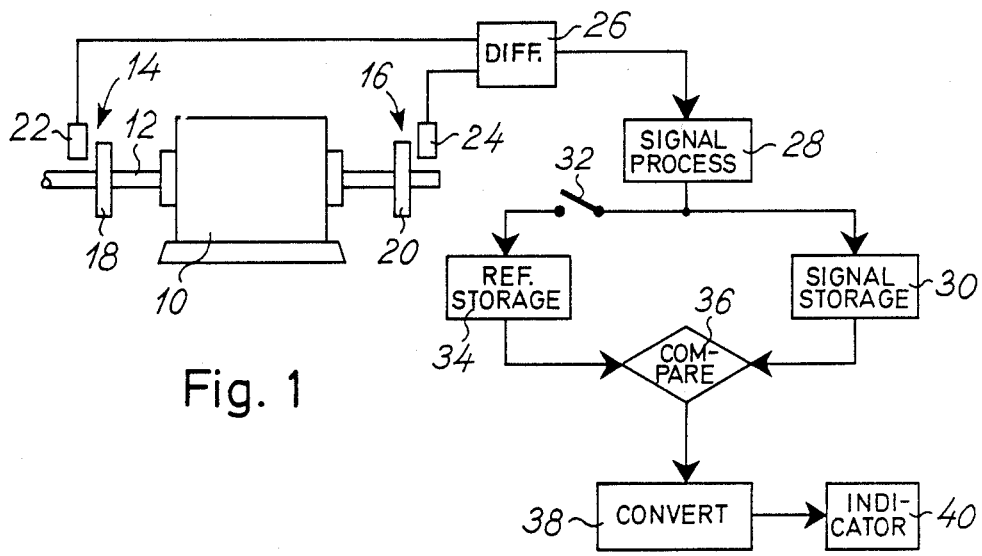

The operation of a cyclically moving, e.g. rotating, power generating and power transmitting element (10, 12) is monitored by monitoring the motion of the element at two points (14, 16) thereof. A measuring signal representing the actual differential motion of the element is provided in a differential circuit (26) and, through appropriate signal processing circuits (28, 30), input to a comparator (36), which further receives a reference signal representing a reference differential motion of the element from a reference store (34). In case the comparison of the reference signal and the measuring signal within the comparator (36) results in a divergence exceeding a predetermined limit, an anomalous signal representing an anomalous operation of the element is generated in a generator (38) which supplies an anomalous signal to an indicator block (40). The reference signal may be provided on the basis of a model representing the operational mode of the element or, alternatively, be provided as a measuring signal supplied from the differential circuit. (FIG. 1).

55 Claims, 10 Drawing Sheets

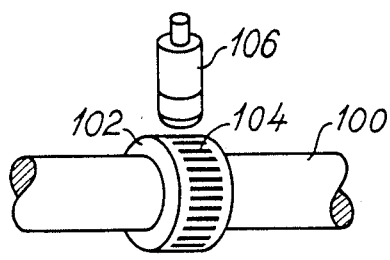
Fig. 3
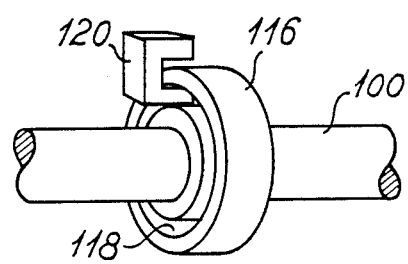
Fig. 5
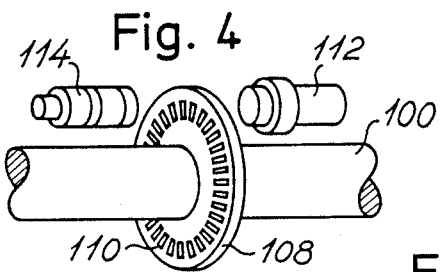
Fig. 4
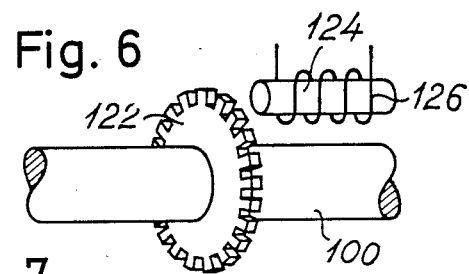
Fig. 6
Fig. 7
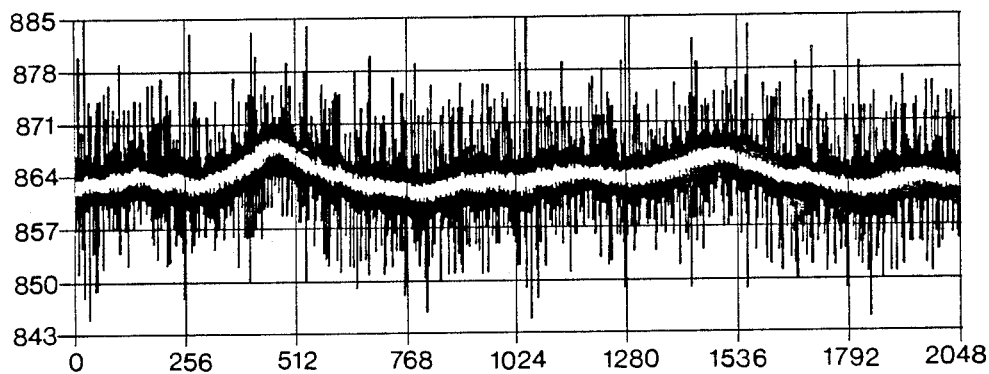
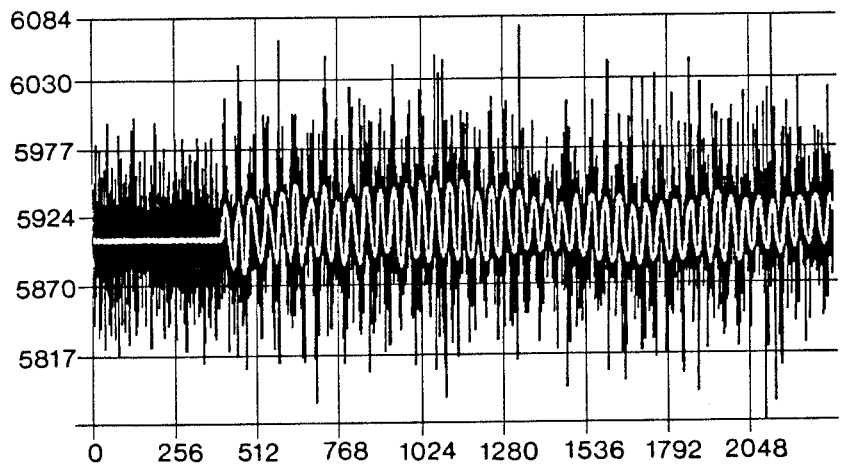
Fig. 8

METHOD OF MONITORING THE OPERATION OF A CYCLICALLY MOVING, POWER GENERATING OR POWER TRANSMITTING ELEMENT AND AN APPARATUS FOR MONITORING THE OPERATION OF SUCH AN ELEMENT

The present invention relates to a method of monitoring the operation of a cyclically moving, power generating or power transmitting element.

In many different applications, a power generating or power transmitting element is performing a cyclic motion, i.e. a rotational motion or a reciprocating motion. The power generating or power transmitting element may be a motor, an engine, a generator, a gear transmission linkage, a transmission shaft or the like. It is well known in the art to arrange a motion detector, such as an optical detector, a magnetic or mechanical detector at or adjacent to the element in order to render it possible to determine if the element is moving or not and to determine the cyclic frequency of the element, if desired. Common to these motion detector applications is the fact that the motion detection serves the purpose of monitoring the motion of the element or a point thereof, exclusively.

Contrary to the well-known art of monitoring the motion of a cyclically moving element or monitoring the motion of a point thereof, the present invention is based on the realization that the operation of the cyclically moving, power generating or power transmitting element may be monitored by monitoring the motion of at least one point of the element, as the information derived from monitoring the motion of the point of the element inherently contains information regarding the operation of the power generating or power transmitting element.

In accordance with the teachings of the present invention, a method of monitoring the operation of a cyclically moving, power generating or power transmitting element by monitoring the motion of at least one point thereof is provided, the method comprising the following sequence of steps:

(a) providing a first reference signal representing a reference motion of the point of the element during at least one cycle, (b) storing the first reference signal in a memory means, (c) providing a time varying measuring signal representing the actual motion of the point of the element during said at least one cycle, and (d) comparing the first reference signal and the measuring signal, so as to generate an anomalous signal representing an anomalous operation of the element during said at least one cycle, in case the comparison of the first reference signal and the measuring signal results in a divergence exceeding a predetermined limit.

Basically, it is believed that the information derived from monitoring the motion of the point of the element originates from the fact that any power generating or power transmitting element is to some extent elastic and therefore is deformed elastically when exposed to physical stresses such as motion accelerating forces, frictional forces etc.

In the present context, the term "anomaly" expresses that the opeation of the element as determined by comparing the first reference signal and the measuring signal is different from the reference motion of the element as represented by the first reference signal.

In the present context, the term "signal" expresses any analog or digital representation of a single physical event or a plurality or sequence of physical events, such as a single value of a voltage or a current, a sequence or train of voltage or current values, e.g. in numerical representation, etc.

In order to render it possible to continuously monitor the operation of the cyclically moving, power generating or power transmitting element, the steps (c) and (d) may be repeated. Preferably, the steps (c) and (d) are repeated during every cycle of the element. Alternatively, the repetition rate may be determined by an external clock, or the steps (c) and (d) may be repeated during every two or more cycles of the element.

In accordance with the presently preferred embodiment of the method according to the invention, at least one further point of the element is monitored, and the reference signal is a difference signal which further represents a difference between reference motions of points of the element during said at least one cycle, and the measuring signal is a difference signal which further represents a difference between the action motion of the points of the element during said at least one cycle. By providing difference signals representing the reference motions and the actual motions of the points of the element, elastic deformations of the element may be monitored as any difference between the motions of the points of the element represents an elastic deformation of the element, which further originates from forces to which the element is exposed or which are produced by the element, such as motion acceleration forces or frictional forces, respectively.

In order to render it possible to determine a possible anomaly, in case the comparison of the first reference signal and the measuring signal results in a divergence exceeding the predetermined limit, the method according to the invention may further comprise the following steps:

(e) providing at least one further reference signal representing a specific anomalous operation of the element during said at least one cycle, (f) storing said further reference signal in a further memory means, (g) comparing the measuring signal and said further reference signal, in case the divergence of the step (d) exceeds said predetermined limit, and (h) generating an indicator signal indicating said specific anomalous operation of the element, in case the comparison of said further reference signal and the measuring signal results in a divergence within a predetermined range.

The first reference signal and the further reference signal may, in accordance with the principles of the present invention, be provided on the basis of a model simulating the reference motion of the element and the anomalous operation of the element, respectively, i.e. by means of appropriate generator means, such as voltage or current generator means, providing digital or analog signals, cooperating with simulation controlling means, such as computer means. Thus, the reference signal may in accordance with the present invention be provided as a combination of a signal representing a torque generated by the power generating element or a torque applied to the power transmitting element and a response transfer function of the element. Alternatively, the first reference signal and the further reference signal may be provided empirically, i.e. the reference signal may, in accordance with the present invention, be provided as measuring signals.

In order to render it possible to provide the reference signal or the reference signals empirically, the method according to the invention may further comprise the step:

(i) storing the measuring signal in a measuring signal memory means.

It is to be emphasized that the concept of the present invention further renders it possible to update the reference signal or signals on the basis of the information derived from the measuring signal stored in the measuring signal memory means, i.e. to alter the first and further reference signals on the basis of the measuring signals. Furthermore, the first and further reference signals may be updated on the basis of measuring results, i.e. measuring signals, provided by monitoring the operation of a different, however, comparable or similar power generating or power transmitting element, such as a different engine or the like of identical or basically identical construction.

In some applications, the power generating or power transmitting element may have one of its points perform a constant or steady motion, as the point in question is connected to a motion fluctuation equalizing component, such as a component of large inertia, e.g. a flywheel, a large mass component, or the like. Consequently, the measuring signal representing the actual motion of the other point may further represent the measuring difference signal, as the said one point of the element constantly performs the reference motion of the point.

In a very important aspect of the present invention the element is a rotating member, and the first and the second points are axially spaced apart along the rotating member. The element may comprise an engine, such as an internal combustion engine, a rotating shaft of an engine, such as an internal combustion engine, a rotating shaft connected to said engine, a generator, or a shaft thereof or connected thereto, a gear transmission linkage or gear box or a shaft thereof or connected thereto or the like. However, in a preferred embodiment of a method according to the invention, the rotating member is a rotating shaft of an internal combustion engine.

The first and the second points of the element may, in accordance with the present invention, be arranged on the rotational axis of the rotating member. However, in order to provide a maximum of information regarding torsional and bending motions of the member, the measuring signals are preferably provided by means of rotational motion detecting means arranged radially offset in relation to the rotational axis of the rotating member.

As the rotating member may further perform eccentric motions in relation to the rotational axis of the member, the measuring signals are preferably provided by means of a rotational motion detecting assembly comprising at least two individual detector devices arranged spaced apart, preferably diametrically opposite one another, in relation to the rotational axis of the rotating member, as the information, i.e. the measuring signals provided by means of the individual detector devices of the rotational motion detecting assembly inherently comprises the information as to any eccentric motion of the rotating member or any eccentric offset of the arrangement of the individual detector devices in relation to the rotation member. Consequently, any eccentric motion of the rotating member may be determined, and any eccentric offset of the arrangement of the individual detector devices in relation to the rotating member may be compensated for.

The present invention further relates to an apparatus for monitoring the operation of a cyclically moving, power generating or power transmitting element, by monitoring the motion of at least one point thereof, the apparatus comprising:

(i) a memory means for storing a first reference signal representing a reference motion of the point of the element during at least one cycle, (ii) a motion detecting means for providing a time varying measuring signal representing the actual motion of the point of the element during said at least one cycle, (iii) a first comparator means for comparing the first reference signal and the measuring signal, and (iv) a first generator means for generating an anomalous signal representing an anomalous operation of the element during said at least one cycle, in case the comparison of the first reference signal and the measuring signal within the first comparator means results in a divergence exceeding a predetermined limit.

Figure 2:
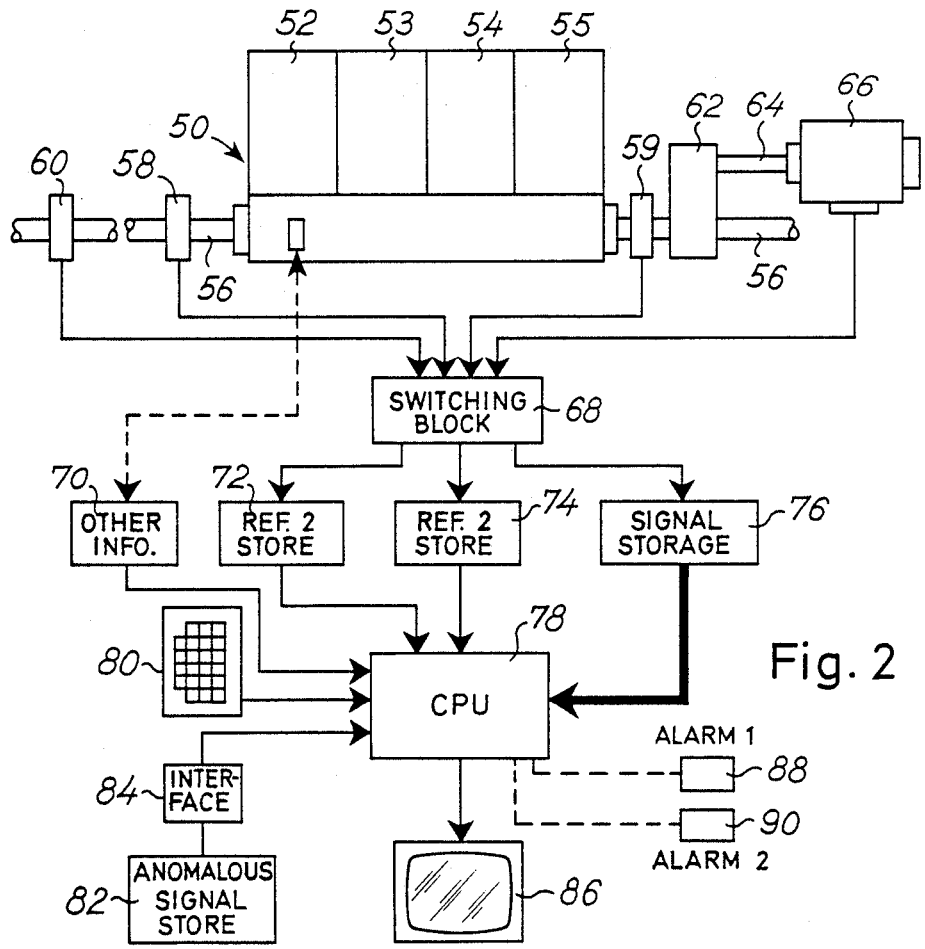
Figure 9:
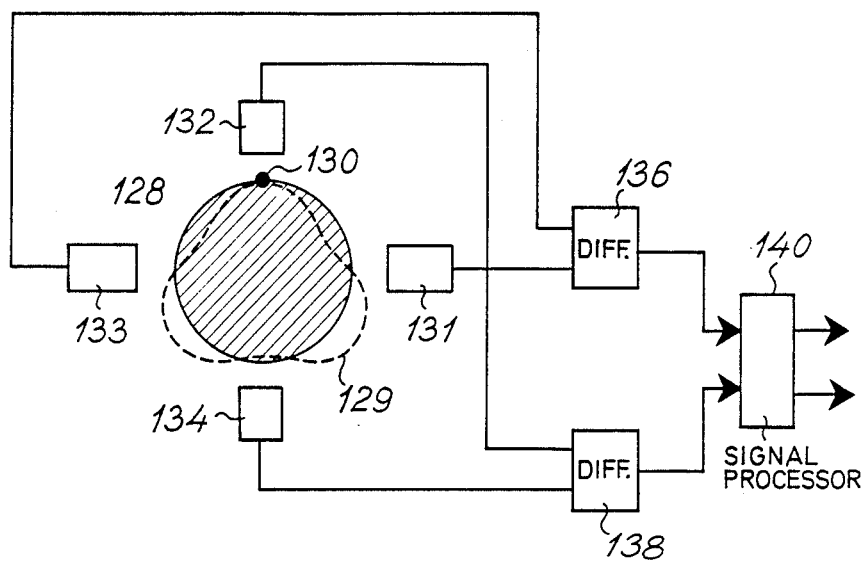
Figure 10:
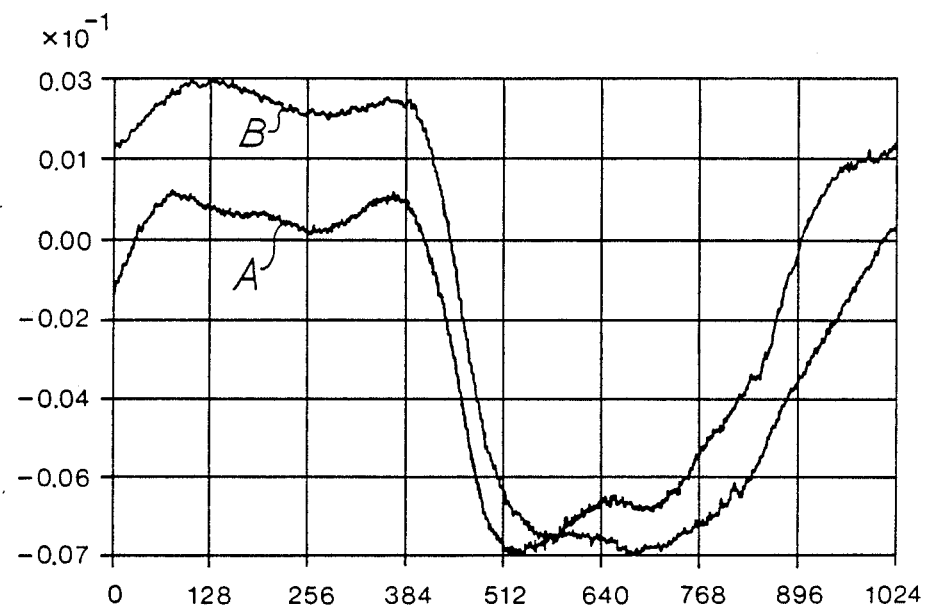
Figure 11:
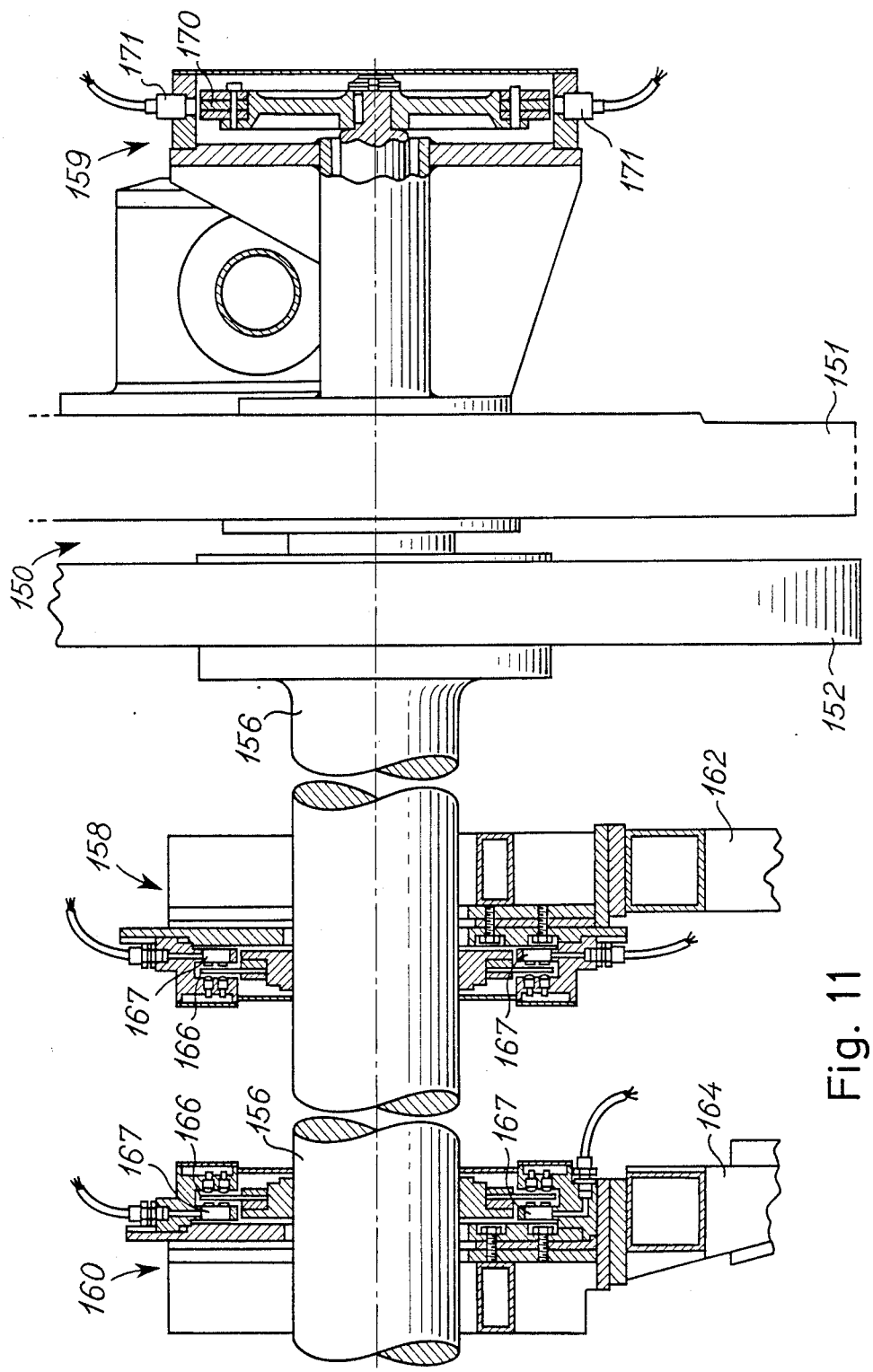
Figure 12:
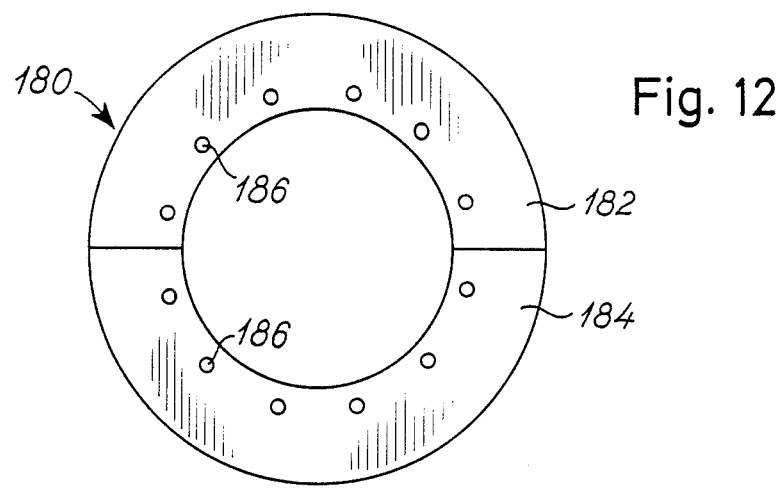
Figure 12A:
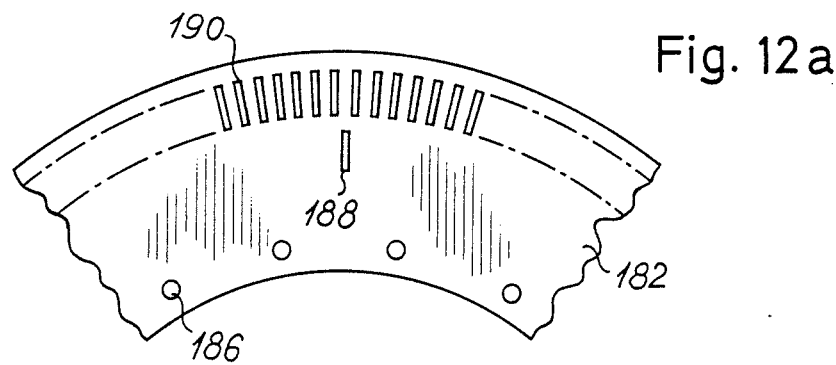
Figure 12B:
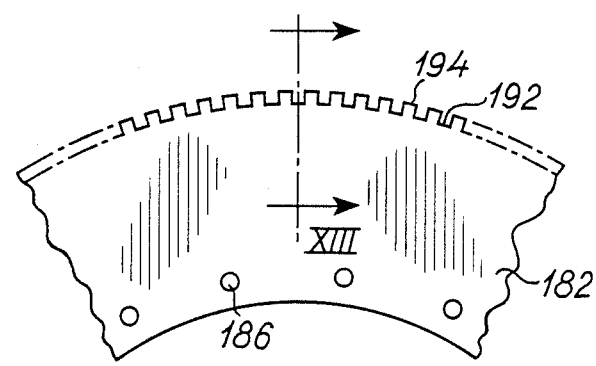
Figure 13:
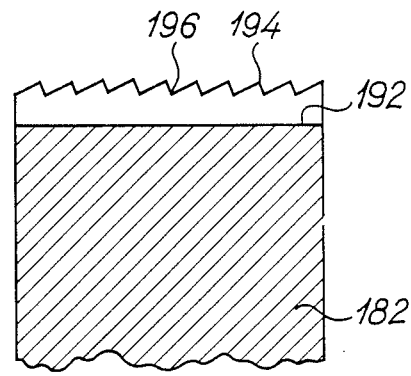
Figure 14:
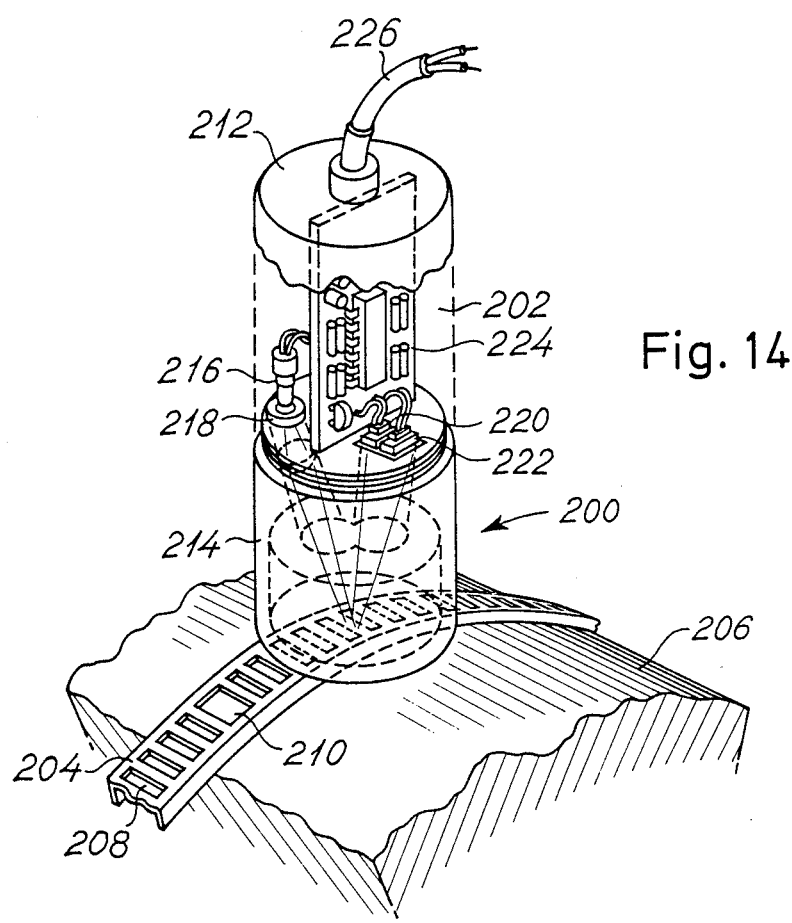
Figure 15:
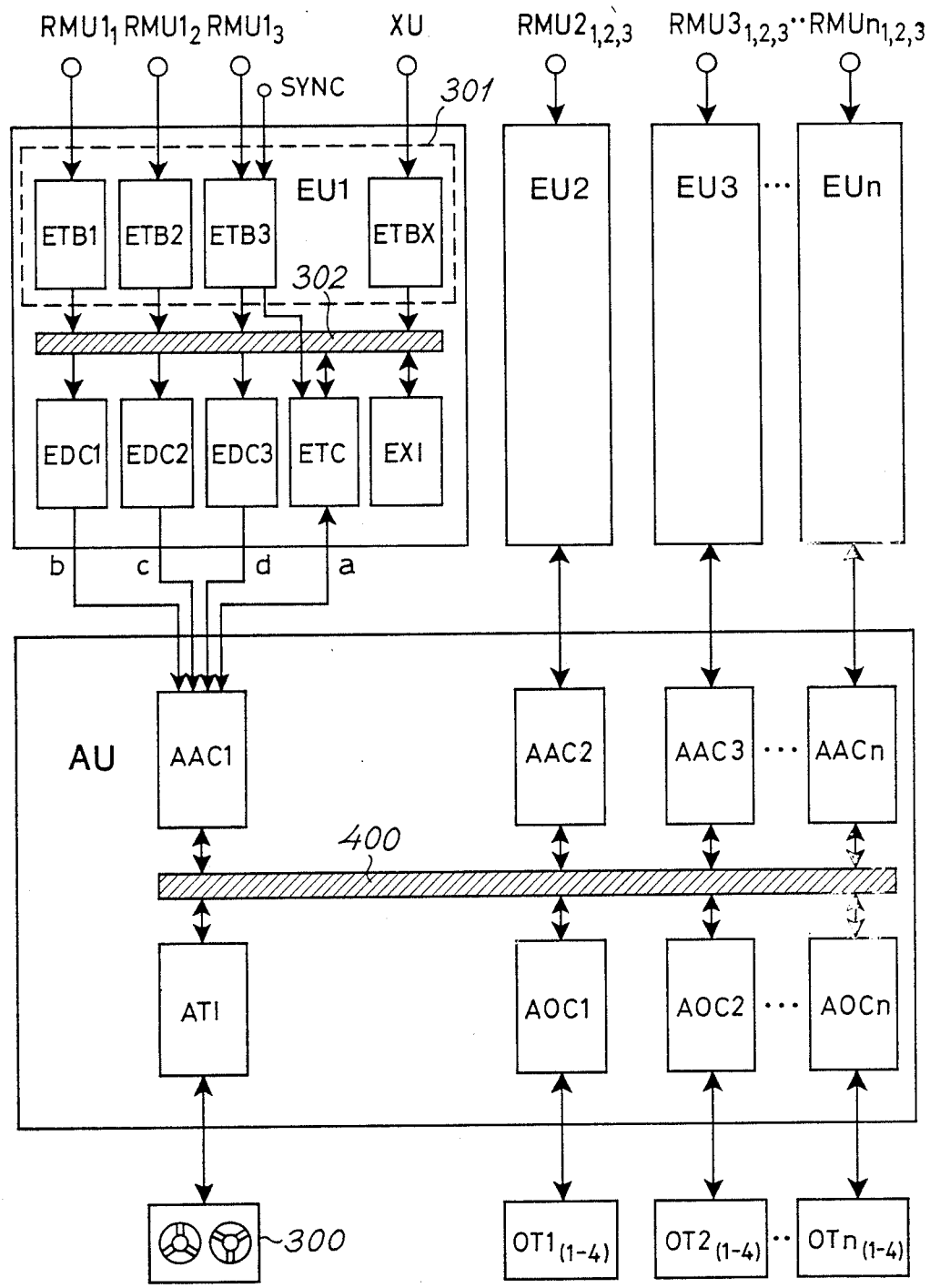
Figure 16:
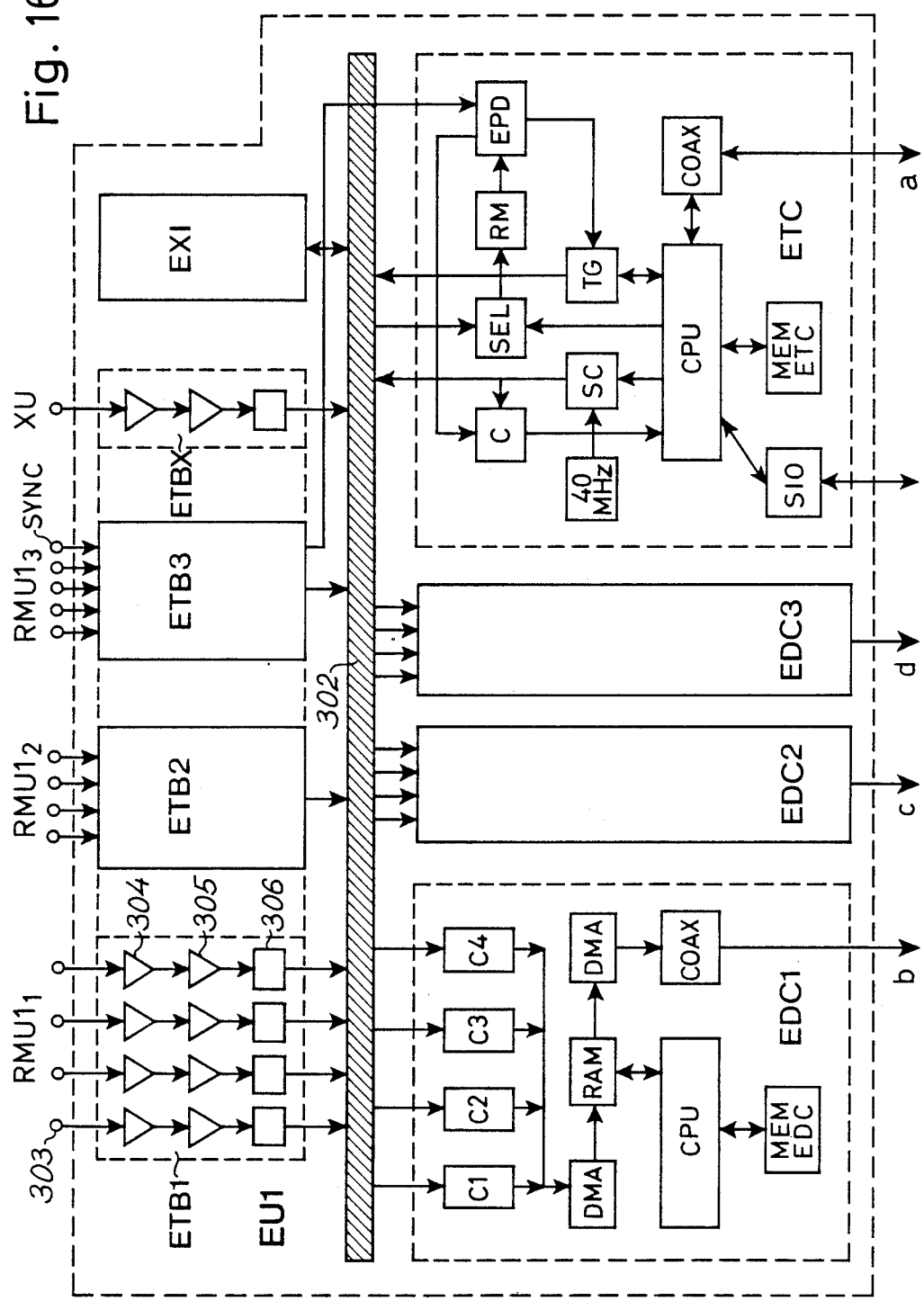
Figure 17:
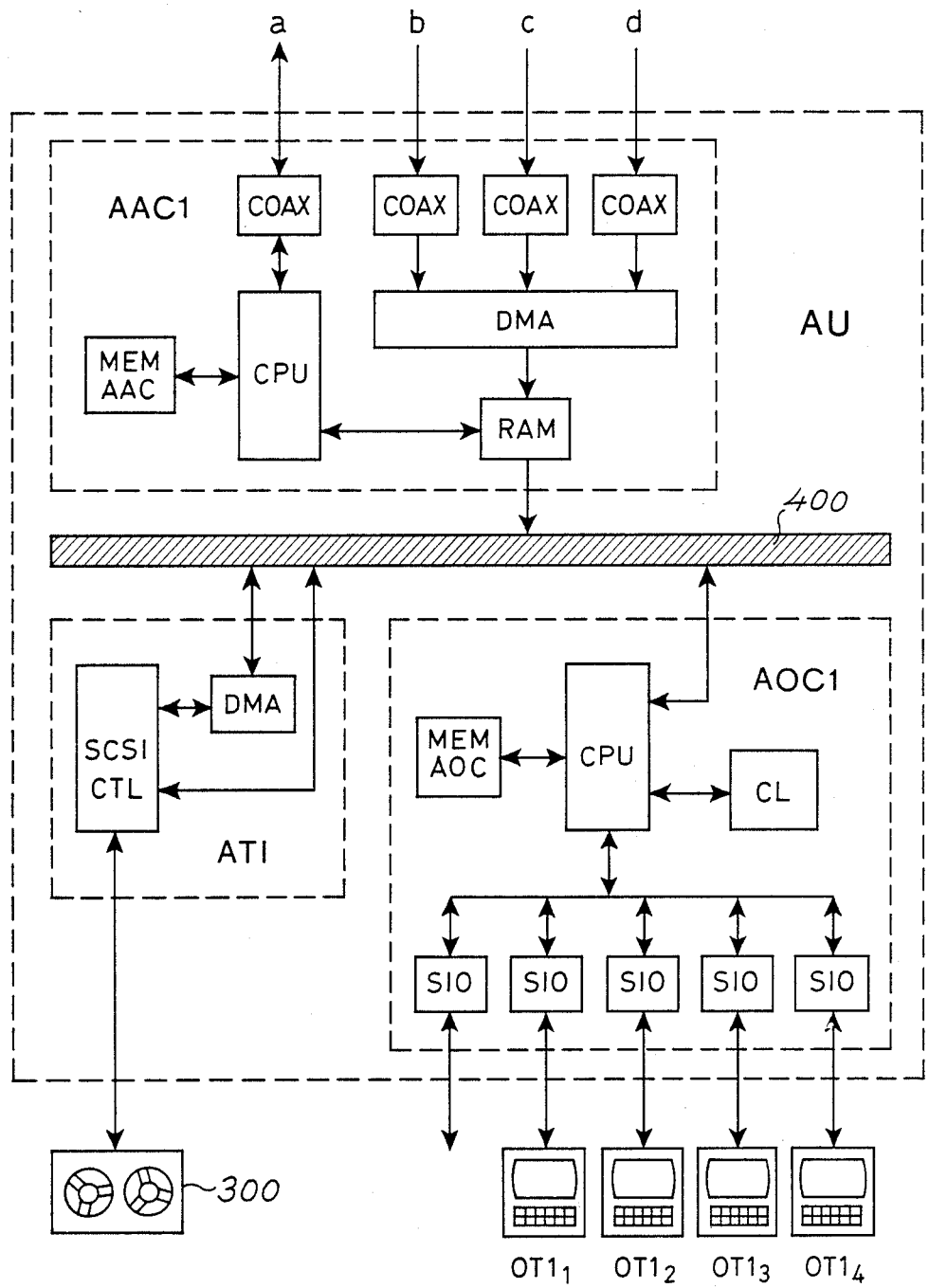
Figure 18:
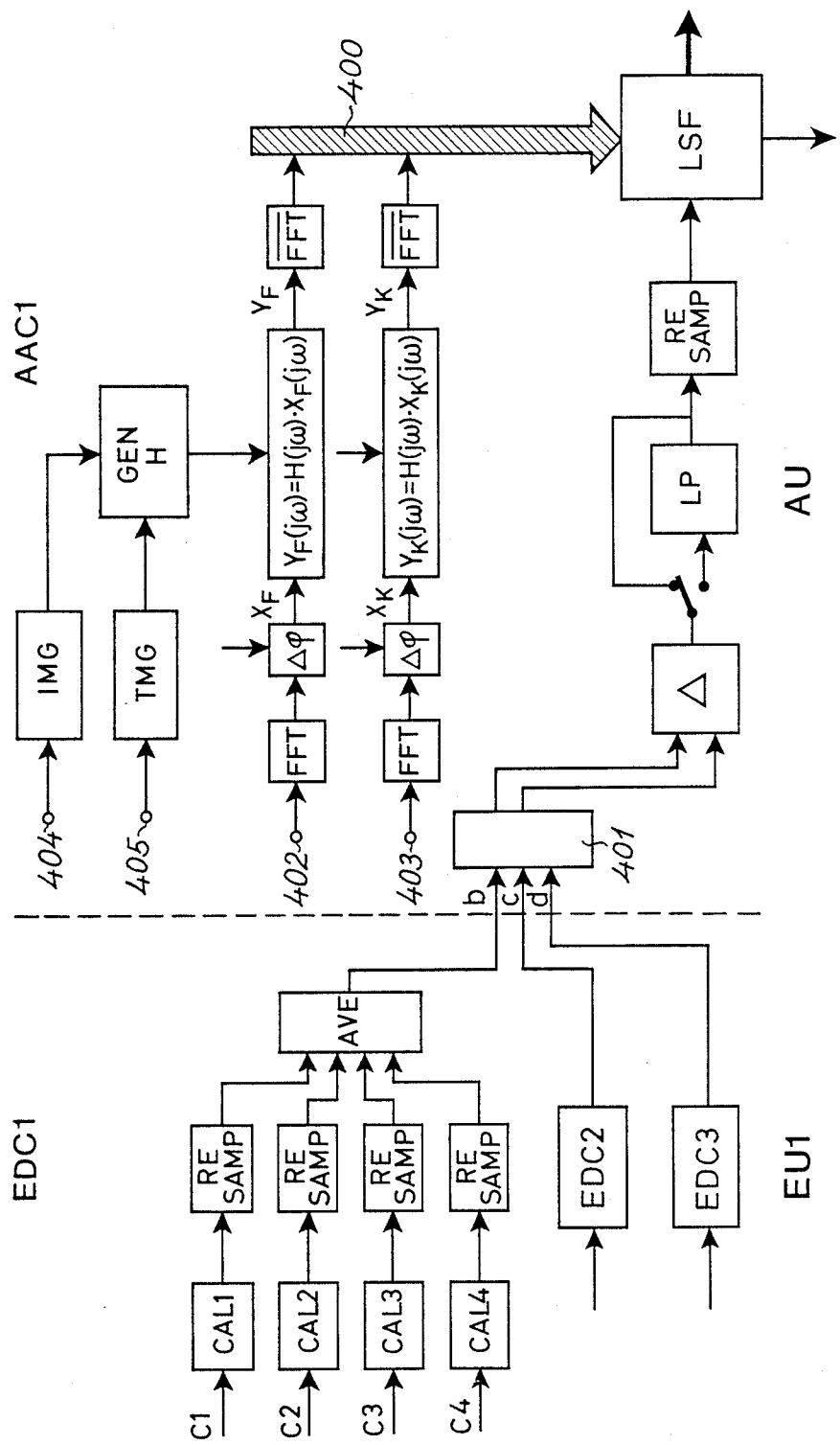

The present invention will now be further described with reference to the drawings, wherein FIG. 1 is an overall schematical view of a basic embodiment of the monitoring concept of the present invention, FIG. 2 is an overall schematical view of a more elaborated embodiment as compared to the embodiment of FIG. 1, FIGS. 3, 4, 5 and 6 are schematical and perspective views of four embodiments of a signal generating device according to the invention, FIGS. 7 and 8 are diagrams illustrating measuring responses provided by means of a bench setup, FIG. 9 is a schematic view of an embodiment of a signal generating assembly according to the present invention, FIG. 10 is a diagram illustrating two measuring response curves of a single cylinder of an internal combustion engine, a diesel engine, FIG. 11 is a schematical and partially sectional view of three different embodiments of signal generating devices arranged on a crank shaft of a large internal combustion engine, FIG. 12 is a plane view of a further embodiment of an encoder disc of a signal generating device according to the invention, FIGS. 12a, 12b and 13 are plane and partly broken away views illustrating details of the further embodiment of the encoder disc shown in FIG. 12, FIG. 14 is a perspective view of a presently preferred embodiment of an encoder strip and a presently preferred embodiment of an encoder device cooperating with the encoder strip, FIG. 15 is a block diagram or flow chart of the present preferred embodiment of the apparatus according to the invention comprising a number of engine units receiving measuring signals from a plurality of encoder devices of the embodiment shown in FIG. 14 and cooperating with an analyze unit, FIG. 16 is a more detailed block diagram of a single engine unit of the apparatus shown in FIG. 15, FIG. 17 is a more detailed block diagram of the analyze unit of the apparatus shown in FIG. 15, and FIG. 18 is a flow chart of the signal processing part of a single engine unit and of the analysis unit illustrating the individual signal processing steps of the individual blocks of the engine unit and of the analysis unit, respectively.

In FIG, 1, an overall schematical view of a basic embodiment of an apparatus for monitoring the operation of a cyclically rotating, power generating or power transmitting device 10 in accordance with the principles of the present invention is shown. The device 10 has a through-going shaft 12 extending from a first and a second end of the device 10. At the first end and at the second end of the through-going shaft 12, a first encoder device 14 and a second encoder device 16, respectively, are arranged. Basically, the encoder devices 14 and 16 are of identical configuration and adapted to provide information about the rotational motion of a first end and a second end, respectively, of the shaft 12. The first and the second encoder devices 14 and 16, respectively, which are to be described in greater detail below comprise rotating parts 18 and 20, respectively, which are mounted on the rotating through-going shaft 12 and rotate therewith, and fixed parts 22 and 24, respectively, which are arranged closely adjacent to the cooperating rotating parts 18 and 20, respectively, and which generate measuring signals representing the actual rotational mode of the shaft at longitudinal positions of the shaft corresponding to the positions of the rotating parts 18 and 20, respectively.

The measuring signals generated by the fixed parts 22 and 24 of the encoder devices 14 and 16, respectively, are supplied to a differential means 26, which generates a difference signal representing the difference between the measuring signal generated by the first encoder device 14 and the measuring signal generated by the second encoder device 16. Dependent on the actual type of measuring signals, the measuring signals being either digital or analog signals, which may represent the actual rotational or angular positions of the rotating parts 18 and 20 of the encoder devices 14 and 16, respectively, the actual rotational or angular velocity of the rotating parts 18 and 20 of the encoder devices 14 and 16, respectively, or the rotational or angular acceleration of the rotating parts 18 and 20, respectively, of the encoder devices 14 and 16, respectively, the differential means 26 is equipped in accordance with the principles well known in the signal or data processing field and provides a difference representing an analog or digital difference of the rotational or angular positions, the rotational or angular velocities or the rotational or angular accelerations of the rotating parts 18 and 20 relative to the fixed parts 22 and 24, respectively, of the encoder devices 14 and 16, respectively. As is well known in the art, signal processing means such as filtering means, differentiation or integration means, analog/digital converter means, digital/analog converter means, sampling and/or resampling means, etc, may be connected between the encoder devices 14 and 16 and the respective inputs of the differential means 26.

The output of the differential means 26 is connected to an input of a block 28, which constitutes an analog or digital signal processing means and which, consequently, processes the difference signal supplied from the differential means 26 in accordance with well known analog or digital signal processing principles, such as amplification, filtering, differentiation, integration, sampling, resampling, analog/digital conversion, digital/analog conversion, etc. The output of the block 28 is connected to an input of a block 30, which constitutes a storage means for storing the measuring difference signal supplied from the signal processing block 28 and further from the differential means 26, and is further connected, through a switching means 32, to an input of a block 34, which constitutes a storage means for storing the measuring difference signal supplied from the signal processing block 28 provided the switching means 32 is activated. The measuring difference signal stored in the block 34 constitutes a reference difference signal. The block 34 may alternatively store a difference signal, which is originally generated from a model representing the operation of the device 10, and which is updated or modified by the measuring difference signal supplied from the signal processing block 34. The reference difference signal is supplied from the output of the block 34 to a reference input of a comparator block 36, the comparison input of which is connected to the output of the block 30. Within the comparator block 36, the actual measuring difference signal supplied from the measuring difference signal storage block 30 is compared to the reference difference signal stored in the reference difference signal storage block 34. Provided the measuring difference signal supplied to the comparison input of the comparator block 36 does not diverge from the reference difference signal supplied to the reference input of the comparator block 36 beyond a predetermined limit, the comparator block 36 supplies an agreement or non-divergence signal from its output or, alternatively, no signal at all. In case the measuring difference signal diverges from the reference difference signal beyond the predetermined limit, a disagreement or divergence signal is supplied from the output of the comparator block 36.

The output signal of the comparator block 36 is supplied to an input of a conversion block 38, which from its output supplies an anomalous signal to a indicator block 40 provided a disagreement of divergence signal is received at the input of the block 38.

The individual blocks 28, 30, 34, 36, 38 and 40 may obviously be implemented in numerous different ways, and the representation of the anomalous signal supplied from the block 38 to the indicator block 40 may obviously be adapted to specific indicator requirements, such as visual or auditive, local or remote indication, etc. Furthermore, as will be described below with reference to FIG. 2 and FIGS. 15–18, data or signal logging means may be included for recording the signals supplied from the different devices, means and blocks shown in FIG. 1, i.e. the input signals of the differential means 26, the output signal of the differential means 26, the output signal of the signal processing block 28, the output signals of the measuring difference signal storage block 30 and of the reference difference signal storage block 34, respectively, the divergence/non-divergence output signal of the comparator block 36 and the anomaly/non-anomaly output signal of the conversion block 38.

It is to be realized that the term "signal" means any analog or digital representation of a single physical event or a plurality of physical events, such as a single value of a voltage or a current, a sequence or train of values of voltages, e.g. in numerical representation, etc.

In FIG. 2, a more elaborate embodiment of an apparatus for monitoring the operation of an internal combustion engine 50, in accordance with the principles of the present invention, is shown. The internal combustion engine 50 comprises four cylinders designated 52, 53, 54 and 55, respectively. A through-going crankshaft 56 of the internal combustion engine 50 extends from a first or left-hand side end of the engine and from a second right-hand side end of the engine. At the first end of the engine 50, a first encoder device 58, basically identical to the encoder device 14 of FIG. 1, is arranged, and at the second end of the engine 50, a second encoder device 59, basically identical to the second encoder device 16 of FIG. 1, is arranged.

The encoder devices 58 and 59 generate measuring signals such as analog or digital signals, or sequences or trains of signals representing the rotational or angular position or derivatives thereof of the crankshaft, representing the rotational or angular position of the crankshaft, the rotational or angular velocity of the crankshaft or the rotational or angular acceleration of the crank shaft at the positions of the first encoder device 58 and the second encoder device 59, respectively.

Remote from the first encoder device 58, a third encoder device 60 is arranged on the crankshaft 56. Consequently, as will be described in greater detail below, the first encoder device 58 and the third encoder device 60 provide measuring signals from which the operation of the power transmitting crank shaft part, which is arranged between the first encoder device 58 and the third encoder device 60, may be determined in accordance with the principles of the present invention.

A gear box 62 is arranged at the right-hand side of the second encoder device 59. As is evident from FIG. 2, the crank shaft 56 extends through the gear box 62, from which a gear box shaft 64 extends a single- or three-phase power generator 66. The gear box 62 transforms the low speed rotation of the crank shaft 56 into a high speed rotation of the gear box shaft 64. The voltage variation of the one or more voltage phases supplied from the power generator 66 includes information regarding the rotation of the gear box shaft 64 in regard to the angular position, the angular velocity and the angular acceleration thereof.

From the encoder devices 58, 59 and 60 and the generator 66 rotational motion representing measuring signals generated therein are supplied to a differential input and switching block 68, basically corresponding to the blocks 26 and 28, shown in FIG. 1, of a signal processing apparatus. As will be evident from the above description of the basic principles of the present invention, the differential input and switching block 68 generates a difference signal representing the difference between the measuring signals generated by two of the measuring signal generating devices, i.e. the encoder devices 58, 59 and 60 and the generator 66. From the differential input and switching block 68, the difference signal to be discussed in greater detail below is switched to a first, second or third block designated 72, 74, and 76, respectively.

The first block 72 constitutes a first reference diference signal storage block, i.e. a block basically corresponding to the block 34 shown in FIG. 1, and the second block 74 constitutes a second reference difference signal storage block also basically identical to the block 34, shown in FIG. 1. The block 76 constitutes a third measuring difference signal storage block, i.e. a block basically corresponding to the block 30, shown in FIG. 1. In the first and the second reference difference signal storage blocks 72 and 74, respectively, a first and a second reference difference signal, respectively, are stored. The first reference difference signal is a reference difference signal representing the reference motion of the internal combustion engine 50 itself, i.e. a reference difference signal provided, as described above with reference to FIG. 1, from a model representing the operation of the internal combustion engine 50, or, alternatively, from the measuring signals supplied from the first and the second encoder devices 58 and 59, respectively, whereas the second reference difference signal is a signal, which represents the reference motion of the crankshaft part between the first and the third encoder devices 58 and 60, respectively, and which is also provided from a model representing the operation of the crankshaft port, or, alternatively, from the measuring signals supplied from the first and the third encoder devices 58 and 60, respectively. Alternatively, the second reference difference signal may represent a reference motion of the gear box 62, i.e. a reference difference signal provided from a model representing the operation of the gear box 62, or, alternatively, from the measuring signals generated by the second encoder device 59 and the generator 66. As the differential input and switching block 68 employs measuring signals supplied from the basically identical encoder devices 58, 59 and 60 and further supplied from the generator 66, the block further includes signal converter or signal processing means for converting or processing the measuring signal supplied from the encoder devices and from the generator 66 to identical configuration.

The apparatus shown in FIG. 2 further comprises a central processing unit (CPU) 78 including a comparator means basically corresponding to the comparator block 36, shown in FIG. 1. The CPU 78 is addressable from a keyboard 80, receives anomaly reference signals from an anomalous signal storage block 82 through an interface 84, and receives further information regarding different operational parameters such as turbo-charger rotational speed, cooling temperature, etc. from an operational parameter input block 70. The CPU 78 has an output connected to a display or monitor 76 and further outputs connected to alarm blocks 88 and 90.

In a first operational mode of the apparatus shown in FIG. 2, the operation of the engine 50 itself is monitored. Consequently, the differential input and switching block 68 switches a difference measuring signal generated from the measuring signals supplied from the first and the second encoder devices 58 and 59, respectively, to the block 76. From the block 76, the measuring difference signal is input to the CPU 78, which also receives a first reference difference signal from the first reference difference signal storage block 72. In the comparator means of the CPU 78 the measuring difference signal and the reference difference signal from the blocks 76 and 72, respectively, are compared, and on the basis of this comparison, the CPU decides if the divergence, if any, between the two signals exceeds a predetermined, acceptable limit. Provided the divergence between the reference difference signal and the measuring difference signal is within the predetermined, acceptable limit, the CPU 78 continues its operation and proceeds to subsequent comparison of a subsequent measuring difference signal supplied from the block 76 and the reference difference signal stored in the block 72 and so forth. In case the operational mode of the engine 50 is altered, the block 70, which receives information from its cooperating sensors, such as temperature and pressure sensors, and supplies information regarding the alternation of the sensed operational parameter or parameters to the CPU 78, and the CPU 78 modifies the reference difference signal received from the block 72 in accordance with the alternation of the operational parameter or parameters controlled by an internal reference modification program of the CPU. In case the comparison of the reference difference signal supplied from the block 72 and modified, if desired, and the measuring difference signal supplied from the block 76 results in a divergence exceeding the predetermined, acceptable limit, the CPU 78 addresses the anomalous signal storage block 82 through the interface 84 and compares the actual measuring difference signal supplied from the block 76 with the different anomaly signals of the block 82, which are modified, if desired, by the CPU 78 in accordance with the information supplied from the block 70. In case the CPU 78 identifies the anomaly of the measuring difference signal, an alarm block identifying the anomaly in question, i.e. one of the alarm blocks 88 and 90, are addressed in order to locally or remotely inform the engine operators about the anomaly which has been identified.

As the CPU 78 sequentially compares the measuring difference signals supplied from the block 76 and the reference difference signal supplied from the block 72 and modified, if desired, in accordance with the information supplied from the block 70, the actual measuring difference signal is displayed to the operator by means of the display 86. As the operator is familiar with the normal measuring difference signal response, the operator may continuously monitor the operation of the engine and further, in case the response displayed on the monitor 86 looks unfamiliar, take whatever precautions he feels are required. Thus, the operator may, through the keyboard 80, instruct the CPU 78 to carry out the comparison between the measuring difference signal and the anomaly signals stored in the block 82 or alternatively make the CPU 78 store the actual measuring difference signal as an anomaly signal in the block 82. In a second operational mode, the differential input and switching block 68 generates a measuring difference signal from the measuring signals supplied from the first and the third encoder device 58 and 60, respectively, and further supplies the measuring difference signals to the block 76, from which the measuring difference signal is further transferred to the CPU 78, in which the measuring difference signal is compared to the second reference difference signal, which is stored in the second reference difference signal storage block 74, as described above.

During the proving or testing period of the monitoring apparatus, the operator inputs a first set of references into the storage blocks 72 and 74, either by addressing the differential input and switching block 68, for transferring an actual measuring difference signal to the storage block in question, i.e. the storage block 72 or the storage block 74, or by inputting a simulation model into the CPU 78 from an input device such as a tape station, a magnetic disc store, etc. The simulation model may include anomaly signals, which are transferred to the anomaly signal storage block 82 and further a reference modification and anomaly signal modification model for modifying the references and the anomaly signals on the basis of the operational parameters provided from the block 70. After the proving or testing period, the references of the storage blocks 72 or 74 may be updated either by inputting an actual measuring difference signal to the block in question or by inputting a modified model into the apparatus in the above described manner. It is believed that the teachings of the present invention renders it possible to employ results obtained while monitoring an engine, e.g. a prototype engine, in connection with different engines of identical or similar construction.

In a further alternative operational mode, the operation of the gear box 62 may be monitored on the basis of measuring signals generated in the second encoder device 59 and in the generator 66, respectively. In some applications, the installation of encoder devices at each end of the element to be monitored is rendered impossible owing to the construction of the element in question. Thus, the engine 50 and the gear box 62 may be integrated, and the encoder device 59 is consequently omitted. Therefore, the measuring signal generated by the generator 66 may in this application be employed instead of the measuring signal generated by the second encoder device 59, as the measuring signal generated by the generator 66 also includes information regarding the motion of the crank shaft 56 at the right-hand side end of the engine 50.

In FIG. 3, a first embodiment of an encoder device according to the invention is shown. The encoder device comprises a sleeve 102, which is arranged on a rotating shaft 100 constituting the element, or part thereof, to be monitored in accordance with the principles of the present invention. On the outer peripheral surface of the sleeve 102, light reflecting and light non-reflecting areas 104 are provided. As will be evident from the description above, the sleeve 102 constitutes the moving part of the encoder device, i.e. the part corresponding to the moving parts 18 and 20 of the encoder devices 14 and 16, respectively, shown in FIG. 1. The encoder device shown in FIG. 3 further comprises a component 106, basically corresponding to the parts 22 and 24 of the encoder devices 14 and 16, respectively, shown in FIG. 1. The component 106 comprises a light emitter and a light receiver, which are adapted to emit light, such as visible light or infrared light, and to receive any light originally emitted from the light emitter and further reflected from a light reflecting surface part of the sleeve 102, respectively. The encoder device shown in FIG. 3 is based on a radial reflectory light detection principle, and the measuring signal generated by the encoder device is a digital signal representing the rotational or angular position or velocity of the shaft 100 at the encoder device. As is well known in the signal and data processing field, the digital signal may be converted into an analog signal in a digital/analog converter, be differentiated or integrated prior to or after conversion into analog form and further sampled, filtered and/or resampled etc.

In FIG. 4, a second embodiment of an encoder device according to the invention based on an axial light transmission detection principle is shown. The moving part of the encoder device comprises a disc 108 having radial slits 110. On the one side of the disc 108, a light emitter device 112 is arranged, and on the opposite side of the disc 108 a light receiver device 114 is arranged. Consequently, the light emitted from the light emitter device 112 is chopped by the solid areas of the disc 108, which together define the slits 110. In an alternative embodiment of the encoder device shown in FIG. 4, the disc 108 is on the one side surface provided with alternating light reflecting and light non-reflecting surface parts, and the light emitter device 112 and the light receiver device 114 are arranged relative to the disc 108 so as to cooperate with the alternating light reflecting and light non-reflecting surface parts of the disc in order to defect the rotational or angular velocity of the disc, and, consequently, the rotational or angular velocity of the rotating shaft 100 in accordance with an axial reflectory light detection principle. The measuring signal generated by the second embodiment, shown in FIG. 4, or the alternative embodiment, described above, of the encoder device may also be processed in any appropriate way, as discussed above with reference to FIG. 3.

In FIG. 5, a third embodiment of an encoder device according to the invention is shown. The moving part of the encoder device comprises a sleeve 116 having on one surface a circular recess 118. The outer peripheral wall of the sleeve 116, which defines the circular recess 118, is provided with axial through-going slits not shown on the drawing. The fixed part of the encoder device shown in FIG. 5 is an integrated light emitting/light receiving opto-coupler 120. The light emitted from the light emitter of the opto-coupler 120 is chopped by the alternating solid parts of the peripheral sleeve wall and the light transmitting slits of the peripheral sleeve wall. Thus, the embodiment shown in FIG. 5 is based on a radial light transmission detection principle and generates a digital signal representation of the rotational or angular position or velocity of the shaft 100 at the encoder device. The digital signal generated by the embodiment shown in FIG. 5 may further, as discussed above, be processed in any appropriate way.

In FIG. 6, a fourth embodiment of an encoder device according to the invention is shown based on an electromagnetic detection principle. The moving part of the encoder device is a tooth disc 122, and the fixed part of the encoder device comprises an armature 124 and an armature coil 126. As the shaft 100 rotates, the alternating teeth and interspaces of the tooth disc 122 generates an alternating current in the armature coil 126. The alternating current generated in the armature coil 126 is a "digital" representation of the rotational position or velocity of the shaft 100 at the encoder device and may also be processed.

A particular calibration aspect of the present invention is illustrated in FIGS. 7, 8 and 9. In FIG. 7, an encoder device of the above described axial light transmission detection principle, shown in FIG. 4, was implemented as a transparent, polyvinylchloride disc of an outer diameter of 400 mm. A photographically produced light transparent/light intransparent film was arranged on one side surface of the encoder disc defining 1024 increments of light transparency/light intransparency and vice versa. The encoder disc was mounted on a crank shaft of a four-cylinder, four stroke diesel engine. While the diesel engine was rotating at a speed of approximately 1350 r.p.m., the encoder disc was exposed to visible light, and the passage of one increment was detected. From a 20 MHz generator, 50 ns pulses were provided, and the number of pulses during the passage of a single increment was counted. In FIG. 7, the abscissa axis corresponds to two revolutions of the encoder disc, and along the ordinate axis, the number of 50 ns pulses counted during each increment passage is registered. The solid line or dark curve shown in FIG. 7 is the actual two revolution 20 MHz pulses counting response. Hardly any information is recognizable from the solid line curve. The encoder disc was thoroughly measured, and a computer was programmed so as to compensate for the minor variations of the individual increments. The compensated or calibrated 20 MHz pulse counting response curve is the light curve of FIG. 7. From the light curve, the operation of the four-cylinder, four stroke diesel engine is very easily recognized. Thus, the compression stroke of two of the cylinders are easily detected at approximately 512 and 1536 increments.

In FIG. 8, another test bench setup was monitored by means of the above described encoder device. On a 120 cm steel shaft of an outer diameter of 40 mm, a first mass constituted by a steel body of an outer diameter of 200 mm and a height of 100 mm was arranged at one end of the shaft, and a second mass constituted by a steel body of an outer diameter of 266 mm and a height of 50 mm was arranged at the outer end of the shaft. The above described encoder disc was mounted on the shaft, while the shaft was rotating at a speed of approximately 195 r.p.m, the shaft was struck by a hammer at an increment of approximately 400, and a torsional oscillation was produced. The uncompensated or uncalibrated 20 MHz pulse counting response curve is shown in solid, dark line in FIG. 8, and the compensated or calibrated response curve is shown in light line.

FIGS. 7 and 8 unambiguously illustrate that the signals provided by means of an encoder device in accordance with the monitoring concept of the present invention to a high degree contain information regarding the operation of the cyclically moving element.

As the rotating member to be monitored, e.g. the shaft 12 shown in FIG. 1, the shaft 56 shown in FIG. 2 or the shaft 100 shown in FIGS. 3-6, apart from torsional oscillations, may bend or otherwise oscillate, the information supplied from a single encoder device on the basis of the principles described above with reference to FIGS. 3-6 contains information regarding torsional oscillations as well as bending oscillations. In order to render it possible to separate the information regarding the bending oscillations from the information regarding the torsional oscillations several fixed detector parts are preferably employed in connection with a single encoder disc or other moving part. In FIG. 9, a circular, solid line 128 designates the circular, outer contour of a rotating shaft, and a differently shaped, dotted line 129 designates an arbitrary motion path of a point 130 of the shaft. Four rotational motion detectors 131, 132, 133 and 134 are arranged angularly spaced apart round the rotating shaft. In FIG. 9, the encoder devices 131-134 define an orthogonal detection system, as the angular distance between any two adjacent detectors is 90°. However, a different angular positioning may be employed for some applications. On the basis of measuring signals generated by the oppositely arranged detectors 131 and 132, a differential means 136 generates a measuring signal representing the differential motion of the shaft perpendicular to the axis connecting the detectors 131 and 133, i.e. the vertical differential motion of the shaft. Correspondingly, the measuring signals generated by the oppositely arranged detectors 132 and 134 are processed in a further differential means 138, which generates a measuring signal representing the differential motion of the shaft perpendicular to the axis connecting the detectors 132 and 134, i.e. the horizontal differential motion of the shaft. The outputs of the differential means 136 and 138 are connected to a further signal processing means 140. The rotational motion detectors or encoder devices 131-134 may alternatively be connected directly to the signal processing means 140.

In FIG. 10, two curves designated A and B are shown illustrating an intact operation and a defect operation of a single cylinder of the above mentioned four-cylinder, four stroke diesel engine, respectively. The response curves are recorded by employing two encoder devices of the above described type, one of which was mounted beyond the crankshaft flywheel, and the other one of which was mounted at the free-running end of the crankshaft. Thus, the response curves are different curves. The abscissa axis contains 1024 increments corresponding to a single rotation of the crankshaft, and along the ordinate axis, the increment variation within the interval $0,03 \times 10^{-1}$ to $-0,07 \times 10^{-1}$, corresponding to a 1 percent variation, are indicated. Obviously, the A- and B-curves are not identical to one another. Within the interval 512-768 increments, the curves are highly different from one another during the power stroke of the cylinder in question.

In FIG. 11, a marine engine operational mode monitoring system is shown schematically. The engine, which is actually a sixteen cylinder four-stroke V-engine producing 4000 h.p. at 700 r.p.m. and supplied by the company Alpha-Diesel, is designated the reference numeral 150. The reference numeral 151 designates the motor block of the marine engine, and the reference numeral 152 designates the flywheel of the engine. The crankshaft of the engine is designated the reference numeral 156, and at a first or left-hand side end of the engine adjacent to the flywheel 152, a first encoder device 158 according to the invention is shown. At the opposite end of the right-hand side end of the engine, a second encoder device 159 according to the invention is mounted. Spaced apart from the flywheel 152 a third encoder device 160 according to the invention is mounted at a third position of the crankshaft. Basically, the encoder devices 158, 159 and 160 correspond to the encoder devices 58, 59 and 60, respectively, shown in FIG. 2. Whereas the second encoder device 159 is supported by the motor block 151 of the engine 150, the first and the third encoder devices 158 and 160, respectively, are supported by means of pillars 162 and 164, respectively, from the marine engine frame and from the hull, respectively, not shown on the drawings. The first and the third encoder devices 158 and 160, respectively, are based on the axial reflectory light detection principle described above with reference to FIG. 4 and comprise very accurately machined encoder discs to be described in greater detail below with reference to FIGS. 12 and 13 cooperating with light reflection/light non-reflection detection devices 167, each comprising a light emitter and a light receiver, in accordance with the principles described above with reference to FIG. 9. The second encoder device 159 is based on the radial reflectory light detection principle described above with reference to FIG. 3 and comprises a very accurately machined encoder disc 170 to be described in greater detail below with reference to FIGS. 12 and 13 cooperating with light reflection/light non-reflection detecting devices 171, each comprising a light emitter and a light receiver, in accordance with the principles described above with reference to FIG. 9.

In FIGS. 12 and 13, a further embodiment of the encoder disc according to the invention is shown. The encoder disc is designated the reference numeral 180 in its entity and comprises two annular halves designated 182 and 184, which are adapted to be arranged enclosing a circular rotating shaft, such as the shaft 156 shown in FIG. 11, and fasten thereto by means of screws extending through holes 186. In the above described marine engine operational monitoring system shown in FIG. 11, the encoder disc 180 was implemented as a steel disc of an outer diameter of 400 mm, an inner diameter of 250 mm, and a thickness of 8 mm. In FIG. 12a, an axial reflectory light detection implementation of the encoder disc 180 is shown, and in FIG. 12b, a radial reflectory light detection implementation of the encoder disc 180 is shown. Common to the implementation shown in FIGS. 12a and 12b, a total of 1024 increments are defined by the light reflecting/light non-reflecting areas of the encoder disc. In FIG. 12a, the upper annular half 182 is provided with equidistant radial slits 190 and an index slit 188. In the above mentioned implementation, each of the slits 190 had a width of 0.4 mm and a height of 10 mm and were arranged on a circle of a diameter of 280 mm. The index slit 188 also measured 0.4 mm × 10 mm and was arranged on a circle of a diameter of 350 mm. In the implementation shown in FIG. 12b, equidistant axial recesses were provided defining recess surfaces 192 and crest surfaces 194 of a width of 0.88 mm and 0.35 mm, respectively. The depth of the recess surface 192 relative to the crest surface was 0.6 mm. In FIG. 13, a cross-sectional view along the line XIII—XIII in FIG. 12b is shown. As is evident from FIG. 13, the crest surface 194 is further machined into a toothed surface defining a total of 10 teeth each of a width of 0.8 mm and a height of 0.17 mm.

In FIG. 14, the presently preferred embodiment of an encoder device according to the invention is shown based on the radial light reflection detection principle discussed above with reference to FIG. 3. The encoder device shown in FIG. 14 is designated the reference numeral 200 in its entirety and is the description below referred to as a rotating measuring unit RMU. The encoder device or RMU 200 comprises a stationary light emitting and light reflection detecting part 202, basically corresponding to the component 106 shown in FIG. 3, and an encoder strip 204 basically corresponding to the sleeve 102 shown in FIG. 3. The encoder strip 204 is mounted on a rotatable shaft, part of which is shown in FIG. 14 and designated the reference numeral 206. The rotatable shaft 206 is the shaft of a power generating or power transmitting element, e.g. the crankshaft of an internal combustion engine such as a marine engine e.g. of the size mentioned above with reference to FIG. 11. Thus, the encoder device or RMU may substitute any of the above encoder devices 158, 159 and 160 shown in FIG. 11.

The encoder strip 204 is a very accurately machined strip including a plurality of apertures, one of which is designated the reference numeral 208. The apertures 208 define non-light reflecting areas, and the areas between the apertures define light reflecting areas. In the embodiment shown in FIG. 14, the rotational detection is based on the transition from non-light reflection to light reflection, i.e. the transition from an aperture to an area between two neighbouring apertures. A total of 1024 less 1 light reflecting areas or increments are defined by the apertures 208 as two apertures are combined into a single large aperture 210, which serves the purpose of defining the absolute position of the encoder strip and consequently the absolute position of the crankshaft.

The stationary light emitting and light reflecting detecting part 202 comprises a first housing part 212 and a second housing part 214. In the first housing part 212, a light emitting device constituted by a laser diode 216 is arranged, which emits light to a convex lens 218 from which a light beam is emitted to the encoder strip 204 as indicated in ghost lines in FIG. 14. The light reflected from the light reflecting areas or increments of the encoder strip 204 is also shown in ghost lines in FIG. 14 and radiated to two light detectors 220 and 222, which are constituted by photo transistors. The second housing part 214 serves the purpose of shielding the light detectors 220 and 222 from receiving any false light. The light detectors 220 and 222 are connected to a printed circuit board 224, which is arranged in the first housing part 212, and the printed circuit board 224 includes an electronic circuit serving the purpose of generating an electrical pulse when the light receiving areas of the light detectors 220 and 222 are exposed to light reflected from an increment at the same time. The time of detection of the individual increments or the passage thereof is consequently determined very accurately, which is of the utmost importance to the reproducibility of the measurement. The electrical pulses generated by the detection of light reflected from the increments are transformed into balanced electrical signals, which are transmitted from the encoder device 200 or the RMY through a multicore cable 226.

Apart from the encoder device 200 shown in FIG. 14, a total of four encoder devices or RMUs together constituting an RMU assembly are preferably arranged in an orthogonal detection system basically of the configuration shown in FIG. 9. In the orthogonal detection system, any interfering disturbances originating from wobbling or bending motions of the crankshaft may be compensated for in the processing of the measuring signals generated by the RMUs in the monitoring apparatus according to the invention as will be described below.

FIG. 15 illustrates a block diagram of a presently preferred embodiment or implementation of the apparatus according to the invention. The apparatus shown in FIG. 15 is of a modular concept and comprises a central analysis unit designated ALU and cooperating with a plurality, n, of engine units, EU1, EU2, EU3 and EUn, from which the analyze unit AU receives measuring signals or data relating to the operation or the conditions of a plurality, n, of engines. The analyze unit AU further communicates with a data logging device 300 constituted by a digital tape recorder and a plurality of operator's terminals designated $OT1_{(1-4)}$, $OT2_{(1-4)}$, $OT3_{(1-4)}$ and $OTn_{(1-4)}$.

Basically, the apparatus shown in FIG. 15 and further in FIGS. 16 and 17 is of the concept shown in FIG. 2. Thus, the apparatus receives signals generated by RMU assemblies mounted adjacent to a respective encoder strip of a crankshaft of an engine, the operation of which is to be monitored. The signals generated by the RMY assemblies which constitute primary transducers and further signals generated by auxiliary units XU which constitute secondary transducers generating signals representing e.g. the temperature, the pressure and the flow at certain parts of the engine are processed, calibrated or normalised in the corresponding engine unit EU, e.g. in the EU1 corresponding to engine No. 1, and after calibration transferred to the analyze unit AU in which the signals or data representing the rotational and torsional motion of the crankshaft from which the actual operational condition of the engine may be derived, as taught by the present invention, are compared to a model representing the normal operational condition of the engine.

The normal operational condition of the engine is, as will be described below with reference to FIG. 18, calculated from the component specifications of the engine by the analyze unit itself and may be tuned during the finishing and commissioning of the engine. In case the signals or data supplied to the analyze unit AU from one of the engine units, e.g. the engine unit EU1, diverge from the corresponding normal condition of the engine, an engine operator is informed and a possible cause of divergence is diagnosed by the analyze unit AU and also presented to the engine operator on one of the operator's terminals. Apart from representing diagnoses in case of divergence from the normal operational code or condition of the engine, the engine operator may by means of this operator's terminal corresponding to the engine, e.g. engine No 1, by means of one of the operator's terminals $OT1_1$–$OT1_4$ call for the characteristic operational variables of the engine and further any progress or development of the operational variables of the engine.

During the continuous monitoring of the conditions or operation of the individual engines Nos. 1–n, measuring signals or measuring data representing the operational conditions of the individual engines are output to the data logging device or digital tape recorder 300. From the data stored by the digital tape recorder 300, statistical analysis may be carried out at a remote computer system including a similar tape station and processing programs corresponding to the processing programs of the engine unit EU and further the analyze unit AU for providing term-long analysis and prognosis calculations by combining signals or data from a single engine during a long period of time and signals or data from other engines. Life time investigations may thus be made and the optimum time of service and/or replacement of engine components may be calculated from these signals or data on the basis of the above analysis and calculations.

The individual engine units EU1–EUn comprise, as is evident from FIG. 15, three RMU assembly inputs and a single XU-input for receiving input signals from a first, a second and a third RMU assembly and from an auxiliary unit XU, respectively. In FIG. 15, the engine unit corresponding to the first engine is shown in greater detail than the engine units EU2 . . . EUn. The engine unit EU1 receives the signals from the RMU assemblies $RMU1_1$, $RMU1_2$ and $RMU1_3$ on engine unit termination boards ETB1, ETB2 and ETB3, respectively. As will be seen from FIG. 15, the rotating measuring unit assembly $RMU1_3$ receives a synchronizing signal designated SYNC from a non-contact rotational sensor of the engine, not shown in the drawings, which signal is input to the ETB3 engine unit termination board. The signals generated by the auxiliary unit XU, i.e. signals representing pressure, temperature and flow at certain parts of the engine, and which are externally converted into digital representation are input to an engine unit termination board ETBX of the engine unit EU1. The ETBs, i.e. the ETB1, ETB2, ETB3 and ETBX, basically serve the purpose of normalising the signals supplied from the measuring signal sources so as to make the entire apparatus independent of the transducer or measuring unit configuration or type. The engine unit termination boards ETB1, ETB2, ETB3 and ETBX are, as illustrated by a dotted line box designated the reference numeral 301, contained on a single circuit card. The outputs of the engine unit termination boards ETB1, ETB2 and ETB3 and connected to a data bus 302 and further to a first engine unit disc computer EDC1, a second engine unit disc computer EDC2 and a third engine unit disc computer EDC3, respectively. The output of the engine unit termination board ETBX is connected to an engine unit auxiliary input EXI through the data bus 302. The engine unit auxiliary input EXI converts the signals or data supplied from the ETBX into measuring units which may be employed in the determination of the operational condition of the engine. The engine unit further comprises an engine unit trig computer ETC, which controls the operations of the engine unit EU1 and which is further controlled from the analyze unit AU. Thus, the ETC serves the purpose of providing coincidence or synchronism of the measurements provided from the RMU assemblies and from the XU.

Now turning to FIG. 16, the engine unit termination boards of the engine unit EU1 is to be described in greater detail. As mentioned above, the ETB1 ... ETB3 serve the purpose of transforming the measuring signals generated by the corresponding RMU assemblies into signals or data which may be further processed by the analyze unit AU. The measuring signals generated by the individual RMUs of the RMU assemblies are balanced electrical pulses, which are transferred from the RMU to the corresponding ETB input through a twisted-pair transmission line. As is evident from FIG. 16 and as is described above with reference to FIG. 14 a total of four RMUs are preferably employed in connection with a single encoder strip. Therefore, the ETBs, e.g. the ETB1 includes four inputs corresponding to the four individual RMUs together constituting the RMU assembly designated $RMU1_1$. The balanced signal supplied from the individual rotating measuring unit, e.g. the rotating measuring unit shown in FIG. 14, is supplied through the above twisted-pair transmission line to a respective input terminal pair, one of which is designated the reference numeral 303 in FIG. 16. It is to be realised that the time of transmission of the balanced electrical signal pulses from the individual RMU to the corresponding input terminal pair of the corresponding ETB through the corresponding twisted-pair transmission line is of no importance provided the transmission lines interconnecting the individual RMUs of the RMU assemblies and the engine unit termination board, e.g. the individual RMUs of the $RMU1_1$ assembly and the ETB1 shown in FIGS. 15 and 16, are of identical length since the time of transmission of the pulses only provides an absolute delay of all measuring pulses generated by the RMUs.

From the input terminal pair 303, the measuring signals are supplied to a balanced input amplifier 304, the output of which is connected to a comparator 305, the output of which is connected to a one-shot gate 306. As will be understood, the balanced input measuring signals are transformed into TTL (Transistor Transistor Logic) compatible square wave signals the front edge of which define the time of detection of an increment and the specific duration which define the time between the duration of a first increment and the detection of a second increment. The above described synchronizing signal SYNC generated by the non-contact rotational sensor of the engine is converted in the engine unit termination board ETB3 into a square wave signal the front edge of which defines a specific position of the internal combustion engine, e.g. the top position of a specific piston of the engine, e.g. piston No 1.

The engine unit trig computer ETC, which is shown in FIG. 15 and further in greater detail in FIG. 16, is a central unit of the engine unit EU and is a master in relation to the FTBs, the EDCs and the EXI of the engine unit EU. The engine unit trig computer ETC first of all coordinates the provision of measuring results from the ETBs and the subsequent processing of signals or data in the EDCs communicating with the ETBs. The engine unit trig computer ETC comprises a central processing unit designated CPU communicating with a serial input/output driver designated SIO serving the purpose of providing communication between the ETC and external equipment as will be described below. The CPU further communicates with a memory of the ETC designated MEM ETC, which includes a random access memory part (RAM), an eraseable programmable read only memory part (PROM), and an electrically eraseable programmable read only memory part ($E^2$ PROM). The CPU also communicates with an input/output driver block or coax driver designated COAX through which the ETC is connected in a serial two-way or simplex high speed coaxial transmission line (a 2M baud transmission line) designated a to the analyze unit AU. The ETC further includes an internal clock preferably generating a high frequency clock pulse of e.g. 40 MHz and designated 40 MHz. The high frequency clock of the ETC, i.e. the clock 40 MHz determines the fundamental time division of the system, and the frequency of the time division is of the utmost importance as to the accuracy of the time measurements, which are carried out in the system. The clock 40 MHz is connected to a frequency divider or scaling block designated SC, which is also addressed from the CPU, and which converts the 40 MHz pulses from the clock into clock pulses of a frequency determined by the CPU. The scaling block SC supplies clock pulses to the data bus 302 of the EU1, and the clock pulses supplied from the scaling block SC of the ETC constitute the clock pulses controlling the operations of the engine unit disc computers EDC1–EDC3 shown in FIG. 16. As mentioned above, the ETC receives a synchronizing signal designated SYNC from the ETB3, which is input to an engine period detector designated EPT. It is to be understood that the EPD serves the purpose of determining the engine period which is identical to a single crankshaft revolution provided the engine is a two-stroke engine, and which is identical to two crankshaft revolutions provided the engine is a four-stroke engine. Through a selector block designated SEL, which is addressed from the CPU, the electrical square wave pulses originating from one of the RMUs of one of the RMU assemblies are gated to a round mark detector block designated RM. The round mark detector block RM detects when a square wave pulse of long duration is supplied to the round mark block, i.e. when the large aperture 210 shown in FIG. 14 is detected by the RMU of FIG. 14. The output of the round mark detector RM is connected to the engine period detector EPD and provides a round mark detection and, provided a synchronizing signal pulse SYNC has been supplied to the EPD, the EPD supplies a pulse to a trigger block TG through which the trig pulse is gated to the data bus 302 provided the trigger block TG is enabled from the CPU. The trig pulse supplied from the trigger block TG to the data bus 302 corresponds to the start of an engine period. The EPD also supplies a pulse to a counter designated C which further receives pulses from the scaling block SC and consequently counts the number of pulses corresponding to an engine period. The result of the counting of the engine period is output from the counter C to the CPU and constitutes a measure of the duration of an engine period counted by the counter C in time clock pulses determined by the scaling block SC.

The ETC comprises, as mentioned above, the serial input/output block SIO, which renders it possible to calibrate the EU from remote equipment during finishing and commissioning of the apparatus. In the embodiment shown in FIG. 16, the communication through the serial input/output block SIO is in RS232 protocol. It is to be mentioned that in the communication between the ETC and the AU, the ETC is the master and polls the AU periodically.

In FIG. 16, the engine unit disc computer corresponding to the first engine unit termination board and further the first rotating measuring unit assembly $RMU1_1$ is shown in greater detail as compared to the block designated $EDC1_1$ shown in FIG. 15. Centrally, the EDC1 comprises a central processing unit designated CPU which communicates with a memory designated MEM EDC comprising an eraseable programmable read only memory part (EPROM) and an electrically eraseable programmable read only memory part ($E^2PROM$). The EDCs also include a random access memory designated RAM, which constitutes a working memory of the EDC as will be described below. The RAM which communicates with the CPU is addressed from a direct memory access block designated DMA and addresses a further direct memory access block also designated DMA. The DMA addressed from the RAM communicates with a one-way serial high speed communication line (2M baud) designated COAX, which drives a coax line designated the reference b. The coax lines of the EDC2 and EDC3 are designated c and d, respectively. The EDC1 further comprises four counters designated C1, C2, C3, and C4, respectively, which receive the calibrated and normalised square wave clock pulses from the one-shoot gates constituting the output gates of the ETB1, one of which is designated the reference numeral 306 in FIG. 16, via the data bus 302. The pulses supplied from the one-shoot gate of the corresponding ETB, i.e., the ETB1 corresponding to the EDC1, are stored in the counters C1–C4. Consequently, the counters continuously measure the time between the individual pulses supplied to the counter and consequently the time between the detection of the individual increments of the encoder strip. The accuracy of the time measurement of the duration of the passage of the increments is determined by the time clock supplied from the ETC described above.

Through the DMA, the data are transferred from the counters C1–C4 to the working memory RAM of the EDC1, in which the data are adjusted or processed in accordance with specification determined by the calibration of the encoder device and in accordance with data stored in the memory MEM EDC controlled by the CPU of the EDC. Furthermore, the data are processed in relation to suppression of noise so that the finally processed data are transferred via the high speed coaxial communication line b of the EDC1 or similarly the communication lines c and d of the EDC2 and the EDC3, respectively, as if the data were provided from a perfect RMU assembly including a perfect encoder strip. Furthermore, the analyze unit AU may, through the two way communication line a to the ETC specify certain requirements as to the representation of the data representing the time measurement and as to how many increments a single measurement is to comprise. The analyze unit AU may consequently determine how many increments are to be represented by a single time measurement as the processing or normalisation is carried out in accordance with the following principles: the measurement is considered a curve constituted by straight line segments connecting the individual increments, and the straight line segment curve is resampled by employing a sampling time corresponding to the total measuring time divided by the number of increments required.

The data transmitted from the EDC output of the EU to the analyze unit AU consequently constitute the actual representation of the position of the encoder strip at equidistant points of time. As the points of time are one and the same for all RMUs or all the RMU assemblies after the resampling of the data supplied to the analyze unit, any difference between the positions of the encoder strips and consequently any torsional motion of the crankshaft at a specific point of time may be determined.

The data are supplied to the analyze unit AU from the EDC outputs of the EU in their order of normalisation and processing. The amount of data supplied to the analyze unit is illustrated in the example below:

It is assumed that the encoder strips include 1024 increments each, and a total of 2048 counter values per rotating measuring unit per engine period is consequently to be transferred, provided the engine is a four-stroke engine. In case the data are not normalised to a different number of increments, a total of 2048 values per engine period, i.e. 4096 bytes are consequently to be transmitted from the EDC after the processing operation since each countervalue is represented by two bytes. In case the engine runs at a speed of 1200 rpm, which corresponds to a total of 10 engine periods per second (an engine period is identical to two revolutions in a four-stroke engine), a total amount of data of 40 kbytes/sec/encoder strip is obtained. Each byte is communicated through the coax block or coax interface of the EDC represented by 12 bits, and one bit is transmitted during a period of time of 4 $\mu$sec (at 2M baud). A total of 40 kbites are consequently transmitted during a period of time of approximately 200 $\mu$sec. The amount of data mentioned above is supplied from each of the RMUs of the RMU assemblies, and, as is evident from FIG. 16, the data are transmitted parallelly from the EDCs via the one-way high speed transmission lines b–d.

The above described engine unit termination board ETBX, which receives signals or data from the auxiliary unit XU regarding the pressure, the temperature and/or the flow at certain parts of the engine, communicates with the engine unit auxiliary input EXI, in which data normalisation or data calibration is carried out in accordance with the principles described above in relation to the EDC. It is to be emphasised that in the embodiment of the apparatus according to the invention shown in FIGS. 15 and 16, the auxiliary unit XU generates digital signals representing a physical quantity or quantities such as the temperature, the pressure or the flow at certain parts of the engine. Obviously, the embodiment of the apparatus shown in FIGS. 15 and 16 may be modified by providing an analog/digital converter converting analog measuring signals generated by temperature, pressure or flow transducers into digital signals. The digital signals supplied to the ETBX from the XU are transformed and scaled into appropriate units in the EXI, from which the data are transmitted to the analyze unit via the data bus 302 and further to the ETC. Like the EDCs, the EXI is controlled from the ETC.

In the lower part of FIG. 15, the analyze unit AU is shown, and in FIG. 17, the analyze unit AU is shown in greater detail. As is evident from FIG. 15, the analyze unit AU comprises n analyze unit analyzing computers designated AAC1 . . . AACn corresponding to the n engine units EU1 . . . EUn. The analyze unit analyzing computer, e.g. the AAC1, communicates with the corresponding engine unit. e.g. the EU1, through the above two-way high speed coaxial communication line a and the one-way high speed coaxial communication lines b, c and d. The AAC1 . . . AACn further communicate with a data bus designated the reference numeral 400 of the analyze unit AU. Through the data bus 400, the analyze unit analyzing computers AAC1. . . AACn communicate with an analyze unit tape interface designated ATI and n analyze unit operator's computers AOC1 . . . AOCn. Each of the analyze unit operator's computers AOC1 . . . AOCn is provided with input/output interfaces for communicating with four operator's terminals designated $OT1_{(1-4)}$, corresponding to the AOC1, $OT2_{(1-4)}$, corresponding to the AOC2, $OTn_{(1-4)}$, corresponding to the AOCn.

Now turning to FIG. 17, the configuration of one of the analyze unit analyze computers, the AAC1, one of the analyze unit operator's computers AOC1, and the analyze tape interface ATI will be described. In the upper part of FIG. 17, the above described high speed coaxial communication lines a, b, c and d are shown connected to a two-way input/output block designated COAX and three input blocks designated COAX, COAX and COAX, respectively. Centrally, the AAC1 comprises a central processing unit designated CPU and communicating with the COAX block and further with a memory of the AAC1 designated MEM AAC comprising an eraseable programmable read only memory part (EPROM) and an electrically eraseable programmable read only memory part ($E^2$PROM). The AAC1 further comprises a direct memory access designated DMA receiving data from the COAX, COAX and COAX and further communicating with a random access memory designated RAM constituting the working memory of the AAC1. From the COAX, COAX, and COAX the data received from the EDCs designated EDC1, EDC2, and EDC3, respectively, are transferred to the working memory RAM through the DMA constituting the basis of the analyses which are performed in the AAC1. As mentioned above, the requirements as to a measurement is determined by the AAC1 of the AU and communicated to the ETC of the EU through the two-way communication line a. After the processing of the set of data in the AAC1, the results are stored in a data bank area, not shown on the drawings, and the AAC1 informs the AOC1 shown in the lower right-hand side of FIG. 7 that a new analysis result has been provided.

The AOC1 shown in the lower right-hand side of FIG. 17 comprises centrally a central processing unit designated CPU communicating with the data bus 400 of the analyze unit AU and further with a memory of the AOC1 designated MEM AOC, a clock designated CL and five serial input/output blocks designated SIO for interfacing with four operator's terminals designated $OT1_1$, $OT1_2$, $OT1_3$ and $OTI_4$ and further another serial unit. The data stored in the data bank area are converted into a format of presentation in the AOC1, and the data which are presented to the operator on one of the operator's terminals, e.g. the operator's terminal designated $OT1_11$, may be presented in a number of standard formats, which may be tuned by the operator. The tuning may e.g. comprise appropriate scaling of the displaying on the operator's terminal. As will be understood from the description above, the AAC1 carries out an analysis of the operational condition of the engine No. 1, and the result of the analysis regarding engine No. 1 may be presented to the operator on the operator's terminal $OT1_1$ . . . $OT1_4$, e.g. the operator's terminal $OT1_1$. Furthermore, the AOC1 may combine the results of the analysis carried out in the individual AACs, i.e. in the AAC1 . . . AACn into a total engine system analysis result.

Through the operator's terminal, e.g. the $OT1_1$, the operator may further specify details regarding the measuring program, limits of alarm and certain parameters which are transferred to the AAC1, in which the analysis program is updated in accordance with the parameters input by the operator.

The results of the analysis carried out in a specific analyze unit operator's computer, e.g. the AOC1 shown in FIG. 17, and preferably involving the operational condition of all engines 1–n, are within a certain time period transferred to the data logger or digital tape recorder 300 through the analysis unit tape interface ATI shown in the lower left-hand side of FIG. 17. The ATI comprises a direct memory access block designated the reference DMA and a small computer system interface and complementary transistor logic block designated SCSI CTL. As will be appreciated, the ATI serves the purpose of interfacing the data logging device 300 and the specific AOC mentioned above. In the presently preferred embodiment of the apparatus according to the invention, the ATI of the AU comprises a component supplied from the company NCR No. 5380 constituting the small computer system interface part of the SCCI CTL block. The data logging device or digital computer 300 may be a tape unit of the type EMCA supplied from the company 3M and is controlled through the SCSI interface and whiich may store 67 Mbytes on a ¼" tape (3M DC600HC data cartridge) at a transfer speed of 34 kbytes/sec. Instead of a data logger device constituted by the above tape unit, a personal computer may for some applications advantageously be connected to the analyze unit through the RS232 interface of the small computer system interface of the ATI.

The operator's terminals $OT1_1$ . . . $OT1_4$ comprise a keyboard and a display constituted by an electroluminescent display providing an extremely compact construction. The keyboard is divided into functional units and the operator's terminal is further provided with a visual indicator and a buzzer serving the purpose of drawing the operator's attention in case a condition is detected and an anomalous alarm is generated.

FIG. 18 is a flow chart illustrating the signal processing of the above described and presently preferred embodiment of the invention shown in FIGS. 15, 16, and 17. In the left-hand side of FIG. 18, the signal or data processing carried out within a single engine unit, the engine unit EU1 is illustrated. In the right-hand side of FIG. 18, the signal or data processing carried out in the analyze unit analyzing computer corresponding to the engine unit EU1, i.e. the AAC1 of the AU, is shown. From the counters C1, C2, C3 and C4, shown in the EDC1 block of FIG. 16, counter values are supplied corresponding to the duration of times from the supply of a first front edge of a first square wave pulse to the supply of a second front edge of a second square wave pulse to the counter from the corresponding one-shoot output gate of the ETB1. Thus, it will be realised that the values present at the output of the counters represent measuring signals $\theta(t)$ representing a constant or basically constant incremental angular value $\Delta\theta$ corresponding to the width of an aperture of the encoder strip. The constant $\Delta\theta$ counter values $\theta(t)$ are supplied from the first, second, third and fourth counters C1, C2, C3, and C4, respectively, to a first, a second, a third and a fourth calibration block, respectively, designated CAL1, CAL2, CAL3, and CAL4, respectively. In the calibration blocks CAL1–CAL4, any inaccuracy of the encoder strip or generally any inaccuracy originating from the encoder devices or the RMUs are compensated for. The calibration blocks CAL1–CAL4 convert the angular function $\theta(t)$ representing the passage of the individual increments, involving constant sampling angle, $\Delta\theta$, into an angular function $\theta'(t)$ of non-constant sampling time $\Delta t$ and non-constant sampling angle $\Delta\theta$. The angular functions supplied from the output of the calibration blocks CAL1, CAL2, CAL3 and CAL4 are input to four resampling blocks designated RESAMP, in which the angular functions are resampled into functions of constant sampling time, $\Delta t$. The outputs of the four resampling blocks designated RESAMP are connected to an averaging block designated AVE, in which the resampled angular functions $\theta(t)$ of constant sampling time, $\Delta t$, are averaged. The result of the averaging is an angular function of constant sampling time, $\Delta t$. The averaged angular function is output through the transmission line b from the EDC1 to the AAC1 of the AU as described above and as illustrated in FIG. 18. Similarly, calibrated and further resampled and averaged angular functions of constant sampling time are supplied from the EDC2 and from the EDC3 representing the angular motions of the respective part of the crankshaft through the transmission lines c and d, respectively, to the AU.

In the analyze unit AU, the signals or data received from the EDC1, EDC2 and EDC3 through the transmission lines b, c and d, respectively, are received in a block, which is designated the reference numeral 401, and from which two calibrated, resampled, constant $\Delta t$ angular functions representing the angular motions of respective parts of the crankshaft, are gated to a differential block designated $\Delta$. In the differential block $\Delta$, the differential angular motion of the crankshaft is determined, i.e. the difference between the above calibrated, resampled, constant $\Delta t$ angular functions $\theta(t)$ are provided representing the torsion $\tau(t)$ of constant sampling time $\Delta t$ of the crankshaft. The torsional signal $\tau(t)$ may, if desired, be filtered in a low pass filter block designated LP and is supplied to a further resampling block designated RESAMP, in which the torsional signal $\tau(t)$ in a low pass filtered version is resampled, if desired, into a torsional signal $\tau(t)$ of constant sampling angle $\Delta\theta$. The resampled torsional signal $\tau(t)$ is decomposed in a least square fit routine in a least square fit block designated LSF, in which the resampled torsional signal $\tau(t)$ is compared to a model representing the torsional signal of the crankshaft and decomposed in the components proportional to the torsional signals of the individual cylinders of the engine, i.e. proportional to the basic vector representation of the torsional signals of the individual cylinders of the engine. From the decomposition of the torsional signal, which has been measured and processed as described above into the basis vector representation of the torsional signals of the individual cylinders, weighing factors and a residue are provided. The weighing factors are measures of the performance as to compression of the individual cylinder, whereas the residue constitutes the remainder of the measuring signal which cannot be assigned a specific cylinder of the engine. The weighing factors and the residue are stored in the data bank of the analyze unit, as described above with reference to FIG. 17.

In the upper part of FIG. 18, the generation of a model representing the operation of engine No. 1 is illustrated. Basically, the model is a combination of a model representing the response of the individual cylinders of the engine during a normal compression and a normal combustion cycle and the transfer of the response generated by the individual cylinders through the crankshaft. Thus, a curve representing the torque generated by a specific cylinder, e.g. cylinder No. 1, during combustion and at a constant $\Delta\theta$ is input to a terminal 402 and processed by employing a Fast Fourier Transformation (FFT) algorithm in a block designated FFT and output to a phase shift block designated $\Delta\phi$. In the phase shift block $\Delta\phi$, the signal transformed in the FFT block is multiplied by a complex number representing the angle of the phase shift from cylinder No. 1 to cylinder No. n. The output of the phase shift block $\Delta$ represents the spectrum of the torque curve during combustion of the cylinders 1–n. Similarly, a curve representing the torque generated by a specific cylinder, e.g. cylinder No. 1, during compression and at constant $\Delta\theta$ is input to a further Fast Fourier Transformation block designated FFT through an input terminal 403. A further $\Delta\phi$ block is provided, in which the signal generated by the FFT block representing the spectrum during compression of cylinder No. 1 is transferred into spectra representing the individual spectra of the torque curve during compression of the cylinders 1–n. The spectrum of the torque curve during combustion is designated $X_F$, and the spectrum of the torque curve during compression is designated $X_K$, and are input to a transfer function simulating block, in which the spectra of the torque curves during combustion and compression, respectively, i.e. $X_F$ and $X_K$, are modified in accordance with the transfer function of the crankshaft, to be described below, for generating a crankshaft response spectrum representing the torque curve during combustion and compression, respectively. The $X_F$ spectrum is processed in a block designated $Y_F(j\omega) = H(j\omega) \times X_F(j\omega)$, in which H represents the transfer function of the crankshaft, $X_F$ represents the spectrum of the torque curve during combustion, and $Y_F$ represents the spectral response or the spectrum of the torsion curve. Similarly, the spectrum of the torque curve during compression, $X_K$, is processed in a block designated $Y_K(j\omega) = H(j\omega) \times X_K(j\omega)$, wherein H designates the above mentioned transfer function of the crankshaft, to be described below, $X_K$ represents the spectrum of the torque curve during compression, and $Y_K$ represents the spectral response or the spectrum of the torsion curve. The torsional spectral responses $Y_F$ and $Y_K$ are further processed in inverse Fast Fourier Transformation blocks designated $\overline{\text{FFT}}$ for generating curves representing the torsion during combustion or compression, respectively. The torsional curves are through the data bus 400 supplied to the above mentioned least square fit block LSF.

The transfer function of the crankshaft is generated by employing an input matrix generator IMG, a transfer matrix generator TMG, and a transfer function generator designated GEN H. On the basis of the model:

$$\dot{X} = A \times X + \sum_{i=1}^{n} B_i \times u_i$$

wherein X and $\dot{X}$ represent the torsion and the rate of change of the torsion, respectively, throughout the crankshaft, A is a constant, and $B_i$ is a constant specifying the overall effect on the crankshaft from a torque $u_i$ acting on a crankshaft part i. In accordance with well-known matrix calculations, the above equation is transformed into: $H(S) = C \times (S \times I - A)^{-1} \times B_i$, wherein H(S) is the transfer function of the crankshaft, C is a vector designating the torsion of the crankshaft from a specific crankshaft part, S is the complex frequency $j\omega$, I is a unit matrix, and A and $B_i$ are specified above. At an input 404 of the IMG, the crankshaft part specifying integer i is input, and at the output the IMG supplies the corresponding values $B_i$ to the transfer function generator GEN H. At an input 405 of the TMG, the parameters of the crankshaft such as parameters relating to inertia, rigidity or stiffness, friction, etc. are input to the TMG, and at the output, the TMG generates the above $(S \times I - A)^{-1}$, which is supplied to the transfer function generator block GEN H. The output of the transfer function generator block GEN H supplies the crankshaft transfer function H(s) to the above described blocks designated $Y_F(j\omega) = H(j\omega) \times X_F(j\omega)$ and $Y_k(j\omega) = H(j\omega) \times X_K(j\omega)$.

Although the invention has been described with reference to the drawings illustrating specific embodiments of the invention, it is to be understood that the invention is not limited to the above embodiments. Numerous modifications may be developed within the scope of the present invention as specified in the appending claims.

I claim:

1. A method of monitoring the operation of a cyclically moving, power generating or power transmitting element, comprising the steps of:
   (a) monitoring the cyclical motions of a first and a second point of said element by generating a first time varying measuring signal representing at least a full cycle motion of said first point and a second time varying measuring signal representing at least a full cycle motion of said second point;
   (b) generating from said first and second time varying measuring signals a time varying difference signal representing a differential motion of said first and said second points;
   (c) providing a time varying reference signal representing a selected operational mode; and
   (d) comparing said time varying difference signal and said time varying reference signal so as to determine whether said element is performing a normal or an abnormal operation.

2. A method according to claim 1, wherein said selected operational mode of step (c) is a normal operational mode.

3. A method according to claim 1, wherein said selected operational mode of step (c) is an abnormal operational mode.

4. A method of monitoring the operation of a cyclically rotating, power generating or power transmitting element, comprising the steps of:
   (a) monitoring the rotations of a first and a second point of said element by generating a first time varying measuring signal representing at least a full cycle rotation of said first point and a second time varying measuring signal representing at least a full cycle rotation of said second point;
   (b) generating from said first and second time varying measuring signals a time varying difference signal representing a torsional motion of said first and said second points;
   (c) providing a time varying reference signal representing a reference operational mode; and
   (d) comparing said time varying difference signal and said time varying reference signal so as to determine whether said element is performing a normal or an abnormal operation.

5. A method according to claim 4, said first and second points being axially spaced apart along said rotating member.

6. A method according to claim 5, said first and second time varying measuring signals being generated by means of rotational motion detecting means arranged radially offset in relation to the rotational axis of said rotating member.

7. A method according to claim 6, said rotational motion detecting means generating signals representing angular, incremental motions of said points as functions of time increments.

8. A method according to claim 7, said angular, incremental motions being functions of time increments being sampled into representations of constant angular increments and varying time increments.

9. A method according to claim 7, said angular, incremental motions being functions of time increments being sampled into representations of varying angular increments of constant time increments.

10. A method according to claim 4, said first and second time varying measuring signals being provided by means of rotational motion detecting assemblies comprising at least two individual detector devices arranged angularly spaced apart in relation to the rotational axis of said rotating member.

11. A method of monitoring the operation of a cyclically rotating, power generating or power transmitting element, comprising the steps of:
   (a) monitoring the rotations of a first and a second point of said element by generating a first time varying measuring signal representing at least a full cycle rotation of said first point and a second time varying measuring signal representing at least a full cycle rotation of said second point;
   (b) generating from said first and second time varying measuring signals a time varying difference signal representing a torsional motion of said first and said second points;
   (c) providing a time varying reference signal representing a reference operational mode by combining a transfer function of said element and one of a torque generated by said element and a torque applied to said element; and
   (d) comparing said time varying difference signal and said time varying reference signal so as to determine whether said element is performing a normal or an abnormal operation.

12. A method according to claim 11, the steps (a), (b), (c) and (d) being repeated.

13. A method according to claim 11, further comprising the steps of:

(e) storing said time varying difference signal generated in step (b) in a memory means.

14. A method according to claim 11, said first and second points being axially spaced apart along said rotating member.

15. A method according to claim 14, said first and second time varying measuring signals being generated by means of rotational motion detecting means arranged radially offset in relation to the rotational axis of said rotating member.

16. A method according to claim 15, said rotational motion detecting means generating signals representing angular, incremental motions of said points as functions of time increments.

17. A method according to claim 16, said angular, incremental motions being functions of time increments being sampled into representations of constant angular increments and varying time increments.

18. A method according to claim 16, said angular, incremental motions being functions of time increments being sampled into representations of varying angular increments of constant time increments.

19. A method according to claim 11, said first and second time varying measuring signals being provided by means of rotational motion detecting assemblies comprising at least two individual detector devices arranged angularly spaced apart in relation to the rotational axis of said rotating member.

20. A method of monitoring the operation of a cyclically moving, power generating or power transmitting element, comprising the steps of:
(a) monitoring the cyclical motions of a first and a second point of said element by generating a first time varying measuring signal representing at least a full cycle motion of said first point and a second time varying measuring signal representing at least a full cycle motion of said second point;
(b) generating from said first and second time varying measuring signals a time varying difference signal representing a differential motion of said first and said second points;
(c) providing a time varying reference signal by storing a signal generated in step (b) and representing a reference operational mode; and
(d) comparing said time varying difference signal and said time varying reference signal so as to determine whether said element is performing a normal or an abnormal operation.

21. A method according to claim 20, the steps (a), (b), (c) and (d) being repeated.

22. A method of monitoring the operation of a cyclically rotating, power generating or power transmitting element, comprising the steps of:
(a) monitoring the rotations of a first and a second point of said element by generating a first time varying measuring signal representing at least a full cycle rotation of said first point and a second time varying measuring signal representing at least a full cycle rotation of said second point;
(b) generating from said first and second time varying torsional signals a time varying difference signal representing a torsional motion of said first and said second points;
(c) providing a time varying reference signal by storing a signal generated in step (b) and representing one of a normal and an abnormal operational mode; and
(d) comparing said time varying difference signal and said time varying reference signal so as to determine whether said element is performing a normal or an abnormal operation.

23. A method according to claim 22, said first and second points being axially spaced apart along said rotating member.

24. A method according to claim 23, said first and second time varying measuring signals being generated by means of rotational motion detecting means arranged radially offset in relation to the rotational axis of said rotating member.

25. A method according to claim 24, said rotational motion detecting means generating signals representing angular, incremental motions of said points as functions of time increments.

26. A method according to claim 25, said angular, incremental motions being functions of time increments being sampled into representations of constant angular increments and varying time increments.

27. A method according to claim 25, said angular, incremental motions being functions of time increments being sampled into representations of varying angular increments of constant time increments.

28. A method according to claim 22, said first and second time varying measuring signals being provided by means of rotational motion detecting assemblies comprising at least two individual detector devices arranged angularly spaced apart in relation to the rotational axis of said rotating member.

29. An apparatus for monitoring the operation of a cyclically moving, power generating or power transmitting element, by monitoring the cyclical motions of a first and a second point of said element; comprising:
(a) a first and a second motion detecting means for generating a first time varying measuring signal representing at least a full cycle motion of said first point and a second time varying measuring signal representing at least a full cycle motion of said second point, respectively;
(b) a difference means for generating from said first and second time varying measuring signals a time varying difference signal representing a differential motion of said first and said second points;
(c) a memory means for storing a time varying reference signal representing a reference operational mode; and
(d) a comparator means for comparing said time varying difference signal and said time varying reference signal so as to determine whether said element is performing a normal or an abnormal operation.

30. An apparatus according to claim 29, wherein said first and second motion detecting means, said difference means and said comparator means being adapted to operate continuously.

31. An apparatus for monitoring the operation of a cyclically rotating, power generating or power transmitting element by monitoring the rotations of a first and a second point of said element, comprising:
(a) a first and a second rotational motion detecting means for generating a first time varying measuring signal representing at least a full cycle rotation of said first point and a second time varying measuring signal representing at least a full cycle rotation of said second point;
(b) a difference means for generating from said first and second time varying measuring signals a time varying difference signal representing a torsional motion of said first and said second points;

(c) a memory means for storing a time varying reference signal representing one of a normal and an abnormal operational mode; and (d) a comparator means for comparing said time varying difference signal and said time varying reference signal so as to determine whether said element is performing a normal or an abnormal operation.

32. An apparatus according to claim 31, wherein said first and second point being axially spaced apart along said rotating member.

33. An apparatus according to claim 32, wherein said first and second rotational motion detecting means being arranged radially offset in relation to the rotational axis of said rotating member.

34. An apparatus according to claim 33, wherein said rotational motion detecting means generating signals representing angular, incremental motions of said points as functions of time increments.

35. An apparatus according to claim 34, further comprising a sampling means for sampling said angular, incremental motions into representations of constant angular increments and varying time increments.

36. An apparatus according to claim 34, further comprising a sampling means for sampling said angular, incremental motions being functions of time increments being sampled into representations of varying angular increments of constant time increments.

37. An apparatus according to clam 31, wherein said first and second rotational motion detecting means comprise at least two individual detector devices arranged angularly spaced apart in relation to the rotational axis of said rotating member.

38. An apparatus for monitoring the operation of a cyclically rotating, power generating or power transmitting element, by monitoring the rotations of a first and a second point of said element, comprising:

(a) a first and a second rotational motion detecting means for generating a first time varying measuring signal representing at least a full cycle rotation of said first point and a second time varying measuring signal representing at least a full cycle rotation of said second point;

(b) a difference means for generating from said first and second time varying measuring signals a time varying difference signal representing a torsional motion of said first and said second points;

(c) a memory means for storing a time varying reference signal representing a normal or an abnormal operational mode by combining a transfer function of said element and a torque generated by said element or a torque applied to said element; and (d) a comparator means for comparing said time varying difference signal and said time varying reference signal so as to determine whether said element is performing a normal or an abnormal operation.

39. An apparatus according to claim 38, wherein said first and second motion detecting means, said difference means and said comparator means being adapted to operate continuously.

40. An apparatus according to claim 39, wherein said first and second points being axially spaced apart along said rotating member.

41. An apparatus according to claim 40, wherein said first and second time rotational motion detecting means being arranged radially offset in relation to the rotational axis of said rotating member.

42. An apparatus according to claim 41, wherein said rotational motion detecting means generating signals representing angular, incremental motions of said points as functions of time increments.

43. An apparatus according to claim 42, further comprising a sampling means for sampling said angular, incremental motions into representations of constant angular increments and varying time increments.

44. An apparatus according to claim 42, further comprising a sampling means for sampling said angular, incremental motions being functions of time increments being sampled into representations of varying angular increments of constant time increments.

45. An apparatus according to claim 38, wherein said first and second rotational motion detecting means comprising at least two individual detector devices arranged angularly spaced apart in relation to the rotational axis of said rotating member.

46. An apparatus for monitoring the operation of a cyclically moving, power generating or power transmitting element by monitoring the cyclical motions of a first and a second point of said element, comprising:

(a) a first and a second motion detecting means for generating a first time varying measuring signal representing at least a full cycle motion of said first point and a second time varying measuring signal representing at least a full cycle motion of said second point, respectively;

(b) a difference means for generating from said first and second time varying measuring signals a time varying difference signal representing a differential motion of said first and said second points;

(c) a memory means for storing a time varying reference signal by storing a single time varying measuring signal generated by said difference means and representing a normal operational mode; and (d) a comparator means for comparing said time varying difference signal and said time varying reference signal on a continuous basis so as to determine whether said element is performing a normal operation.

47. An apparatus according to claim 46, wherein said first and second motion detecting means, said difference means and said comparator means being adapted to operate continuously.

48. An apparatus for monitoring the operation of a cyclically rotating, power generating or power transmitting element, by monitoring the rotations of a first and a second point of said element, comprising:

(a) a first and a second rotational motion detecting means for generating a first time varying measuring signal representing at least a full cycle rotation of said first point and a second time varying measuring signal representing at least a full cycle rotation of said second point;

(b) a difference means for generating from said first and second time varying torsional signals a time varying difference signal representing a torsional motion of said first and said second points;

(c) a memory means for storing a time varying reference signal by storing a signal generated by said difference means and representing a normal operational mode; and (d) a comparator means for comparing said time varying difference signal and said time varying reference signal so as to determine whether said element is performing a normal operation.

49. An apparatus according to claim 48, wherein said first and second points being axially spaced apart along said rotating member.

50. An apparatus according to claim 49, wherein said first and second rotational motion detecting means being arranged radially offset in relation to the rotational axis of said rotating member.

51. An apparatus according to claim 50, wherein said rotational motion detecting means generating signals representing angular, incremental motions of said points as functions of time increments.

52. An apparatus according to claim 51, further comprising a sampling means for sampling said angular, incremental motions into representations of constant angular increments and varying time increments.

53. An apparatus according to claim 51, further comprising a sampling means for sampling said angular, incremental motions being functions of time increments being sampled into representations of varying angular increments of constant time increments.

54. An apparatus according to claim 48, wherein said first and second rotational motion detecting means comprise at least two individual detector devices arranged angularly spaced apart in relation to the rotational axis of said rotating member.

55. A method of providing a model representing a torsional motion of a cyclically rotating power transmitting or power generating element, comprising:

(a) providing a transfer function representative of said element;

(b) providing a signal representing a torque applied to or generated by said element, respectively, and;

(c) multiplying said transfer function and said signal so as to generate a signal including information regarding the transmission of said torque by said element.

* * * * *

UNITED STATES PATENT AND TRADEMARK OFFICE
CERTIFICATE OF CORRECTION

PATENT NO. : 4,783,998

DATED : November 15, 1988

INVENTOR(S) : Curt A. R. Sander

It is certified that error appears in the above-identified patent and that said Letters Patent is hereby corrected as shown below:

Column 10, line 67, "defect" should be --detect--;

Column 12, line 49, "132" should be --133--;

Column 13, line 6, "different" should be --difference--;

Column 13, line 27, "of" (first occurrence) should be --or--;

Column 15, line 20, "RMY" should be --RMU--;

Column 15, line 36, "ALU" should be --AU--;

Column 15, line 51, "RMY" should be --RMU--;

Column 16, line 27, "term-long" should be --long-term--;

Column 17, line 27, "includes" should be --include--;

Column 17, line 67, "FTBs" should be --ETBs--;

Column 18, line 38, "EPT" should be --EPD--;

UNITED STATES PATENT AND TRADEMARK OFFICE
CERTIFICATE OF CORRECTION

PATENT NO. : 4,783,998

DATED : November 15, 1988

INVENTOR(S) : Curt A. R. Sander

It is certified that error appears in the above-identified patent and that said Letters Patent is hereby corrected as shown below:

Column 21, line 68, "$OTl_1 1$" should be --$OTl_1$--;

Column 22, line 39, "whiich" should be --which--.

Signed and Sealed this

Sixth Day of June, 1989

Attest:

DONALD J. QUIGG

Attesting Officer

Commissioner of Patents and Trademarks